United States Patent [19]

Guidoux

[11] Patent Number: 4,621,173

[45] Date of Patent: Nov. 4, 1986

[54] METHOD OF REDUCING THE CONVERGENCE TIME OF AN ECHO CANCELLER AND APPARATUS FOR CARRYING OUT SAID METHOD

[75] Inventor: Loic B. Y. Guidoux, Garancieres, France

[73] Assignee: Telecommunications Radioelectriques et Telephoniques T.R.T., Paris, France

[21] Appl. No.: 504,200

[22] Filed: Jun. 14, 1983

[30] Foreign Application Priority Data

Jun. 14, 1982 [FR] France .................. 82 10310

[51] Int. Cl.$^4$ ............................... H04B 3/20
[52] U.S. Cl. ..................... 370/32.1; 379/411
[58] Field of Search ............... 179/170.2, 170.6, 170.8; 370/32

[56] References Cited

U.S. PATENT DOCUMENTS

| 3,588,385 | 6/1971 | Moye | 179/170.2 |
| 4,334,128 | 6/1982 | Snijders | 179/170.2 |
| 4,355,214 | 10/1982 | Léry et al. | 179/170.2 |

FOREIGN PATENT DOCUMENTS

| 0044598 | 1/1982 | European Pat. Off. | 179/170.2 |
| 2008903 | 6/1979 | United Kingdom | 179/170.2 |
| 2029175 | 3/1980 | United Kingdom | 179/170.2 |

OTHER PUBLICATIONS

"Echo Cancellation on Time-Variant Circuits", Demytho et al., Proceedings of the IEEE, vol. 65, No. 3, Mar., 1977, pp. 444–453.

Primary Examiner—Gene Z. Rubinson
Assistant Examiner—R. Vaas
Attorney, Agent, or Firm—Thomas A. Briody; William J. Streeter; Leroy Eason

[57] ABSTRACT

A method of reducing the convergence time of an echo canceller including a transversal filter having N coefficients comprises at least the following steps:

transmission of a training data signal $D(n)$ constituted by data transmitted at instants $nT$, $T$ being the data interval, and being periodically reproduced after a duration $LT$ at least equal to $NT$ and having the property:

$$\sum_{n=0}^{L-1} d(n) \cdot d^*[(n - i) \text{ modulo } L] = 0 \text{ for } i \neq 0 \text{ and } 1 \leq i \leq N - 1$$

where $d$ and $d^x$ are the value of the data signal $D(n)$ and its complex conjugate value, respectively;

calculation of the coefficients of the transversal filter carried out after the instant of appearance of the echo signal produced in response to said training signal in accordance with the expression:

$$\vec{C} = \vec{C}_o + \frac{1}{L\sigma^2} \sum_{n=0}^{L-1} e(n) \cdot \vec{D^*}(n)$$

where $\vec{C}$ and $\vec{C}_o$ are the vectors of the N coefficients of the transversal filter at the beginning and at the end of the period of calculating the coefficients, respectively, $e(n)$ is the difference signal,
$\vec{D^x}(n)$ is the vector of the complex conjugate values of the N data stored in the transversal filter, and
$\sigma^2$ is a constant term representative of the power of each of the transmitted data.

Said method applied to a linear echo canceller permits of initializing the coefficients of the transversal filter of said echo canceller within a time $2NT$, where $NT$ is the duration of the echo.

17 Claims, 11 Drawing Figures

METHOD OF REDUCING THE CONVERGENCE TIME OF AN ECHO CANCELLER AND APPARATUS FOR CARRYING OUT SAID METHOD

BACKGROUND OF THE INVENTION

1. Field of the Invention

The invention relates to a method of and means for reducing the convergence time of an echo canceller connected in a transceiver arrangement between one-way transmit and receive paths coupled to a two-way path and used to cancel an echo signal produced in the receive path in response to a signal supplied to the transmit path. Such an echo canceller comprises a transversal filter having N controllable coefficients for processing a signal derived from the signal supplied to the transmit path and a circuit for producing a difference signal which is the difference between two signals which are formed from the signal in the receive path and the output signal of the transversal filter, respectively.

2. Description of the Related Art

Echo cancellers are used, for example, in data transmission modems whose transmit and receive paths, together forming a four-wire access, are often coupled by a circuit known as a hybrid coupler in manner such that each modem has a two-wire access to an external communication line. It is known that, when establishing a connection between two modems by their two-wire access, an untimely signal may be produced in the receive path of each modem, said signal termed an echo signal, which is a fraction of the signal in the transmit path of the same modem and which is caused by imperfections of the coupling circuit and/or signal reflections in the connection. An echo canceller has for its object to automatically cancel this echo signal in order to permit simultaneous full-duplex transmission between two modems connected by their two-wire access.

In an echo canceller, the signal attenuating coefficients of the transversal filter are controlled to minimize the mean square value of the residual difference signal or error signal appearing at the output of a subtractive difference circuit. When the echo canceller has converged, the coefficients of the transversal filter are substantially equal to samples of the impulse response of the echo path and the transversal filter provides an echo cancelling signal substantially equal to the echo signal at the sampling instants.

A disadvantage of the known echo cancellers is that their convergence time is generally long. The filter coefficients are iteratively corrected by using a gradient algorithm, according to which the correction term of a coefficient at each iteration is the product of a weighting coefficient $\alpha$ less than 1, the difference signal and a transmitted datum. In the prior art echo cancellers, this iterative mode of coefficient control is used both during the initializing period of the coefficients and during the tracking period in the course of the data transmission proper; see, for example, in this respect the articel of Kurt H. Mueller, entitled: "A new Digital Echo Canceller for Two-Wire Full Duplex Data Transmission", published in IEEE Transactions on communications, Vol. COM-24, No. 9, September 1976, pages 957 to 962. During the follow-up period, in order to avoid that during full-duplex transmission the echo cancelling process will be disturbed by the data signal originating from the remote transmitter and superimposed on the echo signal in the error signal, a weighting coefficient $\alpha$ of very low value is used, which implies small corrections of the coefficients and a very long convergence time amounting to several seconds, which may adversely affect the tracking possibilities of the echo canceller.

For instance from the aforesaid article, it is known to transmit a particular sequence known as maximum length sequence during the initializing period in order to produce an echo signal and to correct iteratively the coefficients of the transversal filter by using a weighting coefficient $\alpha = 1/N$, N characterizing the maximum delay produced by the transversal filter, said fixed weighting coefficient leading to the fastest convergence possible. It is also known to improve this iterative correction process in order to reduce to some extent the convergence time during the initializing period by using a weighting coefficient $\alpha$ which is variable in the course of said period, taking several decreasing values. At the beginning of the initializing period, the echo signal is relatively high with respect to the noise which includes the signal from the remote transmitter and a weighting coefficient $\alpha$ of high value may be used, which permits a fairly large correction of the coefficients, whereas towards the end of said period, where the echo signal tends towards zero, a small weighting coefficient $\alpha$ has to be used, which provides only a small correction of the coefficients of the transversal filter.

It will be obvious, however, that even after this improvement an iterative method of coefficient control during the initializing period cannot lead to a very fast convergence of the echo canceller since the coefficients tend asymptotically towards their optimum values and towards the end of the initializing period substantially the same conditions prevail as in the tracking period with coefficient corrections which are necessarily very small.

SUMMARY OF THE INVENTION

The present invention provides a quite different method of reducing the convergence time of an echo canceller during the initializing period by utilizing the fact that in a modem provided with an echo canceller it is possible to locally transmit a particular data sequence selected for producing an echo signal that can be rapidly cancelled without successive corrections of the coefficients of the transversal filter.

According to the invention a method of reducing the convergence time of an echo canceller comprises at least the following steps:

transmission of a training data signal D(n) constitute by datums transmitted at instants nT, T being the datum interval, and signal D(n) being periodically reproduced after a duration LT equal to at least NT where N is the number of coefficients of the transversal filter, and having the property:

$$\sum_{n=0}^{L-1} d(n) \cdot d^*[(n - i) \text{ modulo } L] = 0 \text{ for } i \neq 0 \text{ and } 1 \leq i \leq N - 1$$

where d and $d^x$ are the value of a datum of the data signal D(n) and its complex conjugate value, respectively;

calculation of the coefficients of the transversal filter carried out after the instant of appearance of the echo signal produced in response to said training signal in accordance with the expression:

$$\vec{C} = \vec{C_o} + \frac{1}{L\sigma^2} \sum_{n=0}^{L-1} e(n) \cdot \vec{D^*}(n)$$

where $\vec{C_o}$ and $\vec{C}$ are the matrix row vectors of the N coefficients of the transversal filter at the beginning and at the end of the period of calculating the coefficients, respectively, e(n) is the difference signal, $\vec{D^*}(n)$ is the matrix row vector of the complex conjugate values of the N datums stored in the transversal filter, $\sigma^2$ is a constant term representative of the power of each of the transmitted datums.

If the echo signal to be cancelled does not include a d.c. component, which occurs, for example, in a modem where the echo is produced by a modulated carrier signal and where cancelation is effected on the received signal prior to its demodulation, it is also possible to use as a training signal a signal having maximum length sequences having the property:

$$\sum_{n=0}^{L-1} d(n) \cdot d^*[(n-i) \text{ modulo } L] = -1$$

for $i \neq 0$ and $1 \leq i \leq N-1$

The method according to the invention thus permits of obtaining the coefficients of the transversal filter for cancelling the echo signal after a calculation interval LT, which may be equal to NT and which immediately follows the appearance of the echo signal produced in response to the training signal. It is advantageous for the coefficients $\vec{C_o}$ of the transversal filter to be made equal to zero at the beginning of this calculation interval.

The method according to the invention may be used in a duplex process for simultaneously initializing the coefficients of the transversal filters of the echo cancellers of two transceiver arrangements interconnected by a two-way transmission path. In this case two training signals D(n) and G(n) are respectively transmitted in each transceiver arrangement and have one or the other of the two properties mentioned above and must have, in addition, the property:

$$\sum_{n=0}^{L-1} d^*[(n-i) \text{ modulo } L] \cdot g[(n-i') \text{ modulo } L] = 0 \text{ (or } = -1)$$

for i and i' such that $0 \leq i \leq N-1$ and $0 \leq i' \leq N-1$, where g is the value of a datum of the data signal G(n).

The method according to the invention can also be used in a canceller for echoes subjected to frequency off-set; comprising, besides a transversal filter having N controllable coefficients, a phase-shifting circuit connected between the output of the transversal filter and an input of the difference circuit and receiving a simulated phase shift signal from a phase generator for compensating for the phase shift between the echo signal and a difference signal. In this case the method according to the invention comprises at least the following steps:

transmission of said training signal D(n) during two time intervals $[p_1], [p_2]$ each having said duration LT, in the course of which the phase of the echo signal has the values $\phi(p_1)$ and $\phi(p_2)$, each being substantially constant, the space between said two intervals exceeding either interval, so that $\phi(p_2) - \phi(p_1)$ has an appreciable magnitude;

during the time interval $[p_1]$, calculation of the coefficients of the transversal filter;

during the time interval $[p_2]$:

maintaining the coefficients of the transversal filter at their calculated values, maintaining the phase shift of the phase shift simulating signal applied to said phase-shifting circuit at zero, calculating a quantity $s(p_2)$ formed by accumulating products of two factors, one derived from the output signal of the phase-shifting circuit and the other from the difference signal (or from the received signal); and at the end of the time interval $[p_2]$ a processing operation to derive from the quantity $s(p_2)$ the phase difference term $\phi(p_2) - \phi(p_1)$ and a processing operation to derive from said phase difference term a phase variation term $\Delta\omega \cdot T$ formed in accordance with the expression:

$$\Delta\omega = \frac{\phi(p_2) - \phi(p_1)}{t_2 - t_1}$$

where $\Delta\omega$ represents the angular frequency variation corresponding to the frequency off-set and $t_2 - t_1$ is the average time difference between the time intervals $[p_2]$ and $[p_1]$, the two terms thus formed being used to initialize the phase of the phase shift simulating signal produced by said phase generator circuit.

BRIEF DESCRIPTION OF THE DRAWINGS

The invention will now be described by way of example with reference to the accompanying drawings, in which.

BACKGROUND INFORMATION

Figure 1:
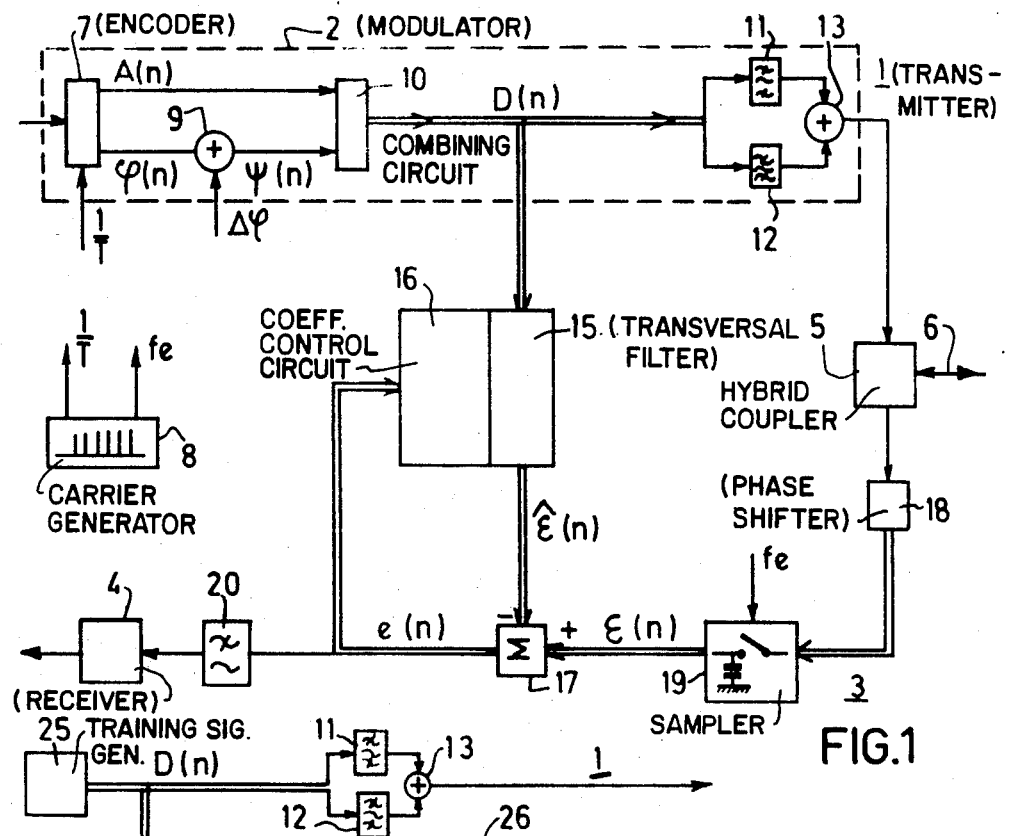
FIG. 1 shows the circuit of an echo canceller comprised in a modem to which the method of the invention can be applied.

The block diagram of a modem provided with an echo canceller is shown in FIG. 1. The modem comprises a transmit path 1 including a modulator 2 receiving data from a terminal (not shown) and a receive path 3 including a receiver 4 supplying data to this terminal. The output of the modulator 2 is connected to a transmit access of a hybrid coupling circuit 5 and a receive access of this coupling circuit is connected, by way of a given number of elements to be described hereinafter, to the input of the receiver 4. This hybrid coupling circuit 5 permits of coupling the transmit and receive paths of the modem to a two-way path 6 for full duplex connections with a distant modem which is coupled in the same manner with the transmission path 6.

When the modulator 2 transmits in the transmit path 1 a signal modulated by the data to be transmitted towards the remote modem, an untimely echo signal may be produced in the receive path 3 due to imperfections of the coupling circuit 5 or to reflections in the transmission path 6, which signal may disturb in the receiver 4 the demodulation of the received signal originating from the remote modem. The echo canceller incorporated in the modem of FIG. 1 has to eliminate the echo signal in the receive path 3. Let it be assumed that the echo signal is of the linear type, that is to say, in the echo path to which the output signal of the modulator is applied there only occur operations of linear character which do not cause the phase or the frequency of the echo signal to vary from that of the transmitted signal.

The echo canceller of FIG. 1 uses a complex data signal corresponding to the data applied to the modulator. Assuming, for example, the modem uses phase modulation or phase and amplitude modulation for the transmission of the data, the complex data signal used in the echo canceller can be obtained from a modulator 2 constructed as follows. This modulator comprises an encoding circuit 7 receiving the data to be transmitted and supplying a pair of signals representative of the amplitudes $A(n)$ and the phase changes $\phi(n)$ to be assigned to a carrier wave as a function of the data at sampling instants $nT$ determined by a generator 8 of a carrier wave of frequency $1/T$, $1/T$ being the modulation frequency and $n$ being an integer varying from $-\infty$ to $+\infty$. In order to take account of the phase variation $\Delta\phi$ of the (unmodulated) carrier during each modulation interval $T$, an adding circuit 9 is used to supply at each instant $nT$ the sum $\phi(n)+\Delta\phi$, which is representative of the absolute phase $\psi(n)$ of the modulated carrier to be transmitted. The two signals $A(n)$ and $\psi(n)$ are combined by a circuit 10 which forms the real component $A(n)\cos\psi(n)$ and the imaginary component $A(n)\sin\psi(n)$ of the complex signal $D(n)$. In the modulator 2 these two components are applied to bandpass filters 11 and 12, the output signals of which are added in an adding circuit 13 to form the analog modulated carrier signal which is directly applied to the transmit access of the hybrid coupling circuit 5.

The complex signal $D(n)$ thus formed in the modulator 2 is also used in the echo canceller. It should be noted here that in the various diagrams of the present patent application the two-line connections convey both the real and imaginary components of a complex signal, but in most cases reference will only be made to complex signals conveyed by these connections. Likewise, in processor circuits processing complex number signals, the operations carried out in practice on the real and imaginary components of these complex number signals will, in general, not be explicitly dealt with.

The echo canceller included in the modem of FIG. 1 comprises a transversal filter 15 receiving the complex signal $D(n)$ sampled at the instants $nT$ and assumed, for example, to be of the analogue type. The transversal filter 15 is provided with a coefficient control circuit 16. The complex output signal of the filter 15 is applied to the $(-)$ input of a difference circuit 17. To the $(+)$ input of this difference circuit 17 are applied samples of an analog signal, complex in general, which are formed starting from the signal appearing at the receive access of the coupling circuit 5. In order to form these samples a circuit 18 is used which supplies a complex signal, whose real part is the signal from the coupling circuit 5 and whose imaginary part is the same signal subjected to a 90° phase shift. The complex signal supplied by the circuit 18 is applied to a sample-and-hold circuit 19, in which sampling is carried out at a frequency $f_e$ of a sampling signal supplied by the generator 8. This frequency $f_e$ is a multiple of the modulation frequency $1/T$ and has a value such that the Shannon theorem is satisfied with regard to the echo signal, that is to say, with regard to the signal supplied by the modulator 2. However, in order to simplify the explanations the following description will consider only those of the samples supplied by the circuit 19 which are produced at the frequency $1/T$ at the same instants $nT$ as the samples of the data signal $D(n)$, it being understood that the other sequences of samples at the frequency $1/T$ have to be treated in the same manner.

The complex difference signal supplied by the difference circuit 17 is applied to the control circuit 16 in which it is used to control the coefficients of the transversal filter 15. When these coefficients are suitably controlled, the echo copy signal supplied by the transversal filter 15 is substantially equal to the complex version of the echo signal appearing at the receive access of the coupling circuit 5 so that the echo signal is practically cancelled in the difference signal appearing at the output of the circuit 17. Of this complex difference signal, thus freed from the echo signal, only the real component is used in the receiver 4 of the modem after having been previously filtered in a low-pass filter 20.

For an accurate description of the operation of such an echo canceller and an explanation of how the method according to the invention can be applied thereto, it is useful to indicate the calculations to be carried out with the aid of a vectorial notation. For example, when at an instant $nT$ the transversal filter 15 stores the N preceding samples of the data signal $D(n)$ applied to its input, these N samples can be represented by a matrix row vector $\vec{D}(n)$. The N coefficients of the filter 15 at the instant $nT$ can also be represented by a marix row vector $\vec{C}(n)$.

With this notation the echo copy signal $\hat{\epsilon}(n)$ supplied by the transversal filter results from the operation:

$$\hat{\epsilon}(n) = \underline{D}(n) \cdot \vec{C}(n) \tag{1}$$

$\underline{D}(n)$ being the transpose of vector $\vec{D}(n)$. In all equations herein, the dot symbol "·" is used to connote multiplication There may also be defined a vector $\vec{k}$ having N components which are samples of the impulse response of the echo path to which the data signal $D(n)$ is applied. It can then be written that the complex echo signal $\epsilon(n)$ appearing at the $(+)$ input of the difference circuit 17 results from the operation:

$$\epsilon(n) = \underline{D}(n) \cdot \vec{k} \quad (2)$$

It will now be assumed that the remote modem does not transmit any data signal that can be superimposed on the echo signal $\epsilon(n)$. Then the error signal $e(n)$ appearing at the output of the difference circuit 17 can be written:

$$e(n) = \epsilon(n) - \hat{\epsilon}(n) = \underline{D}(n) \cdot [\vec{k} - \vec{C}(n)]$$

This error signal $e(n)$ is cancelled when $\vec{C}(n) = \vec{k}$. In order to obtain this result in practice, which means that the echo signal is cancelled, the prior art echo cancellers use the criterion consisting of minimizing the mean square value of the error signal $e(n)$ by using a gradient algorithm for effecting iterative control of the coefficients of the transversal filter 15 in accordance with the recursion formula $$\vec{C}(n+1) = \vec{C}(n) + \alpha \cdot e(n) \cdot \vec{D}^x(n) \quad (3)$$

in which $\alpha$ is a coefficient less than 1, and $\vec{D}^x(n)$ is a vector whose components are complex conjugate to those of the vector $\vec{D}(n)$.

By using the formulae (1) and (2) the recursion formula (3) may also be written:

$$\vec{C}(n+1) = \vec{C}(n) + \alpha \cdot \overline{\overline{A}}(n) \cdot [\vec{k} - \vec{C}(n)] \quad (4)$$

in which $\overline{\overline{A}}(n)$ is matrix of the order N such that:

$$\overline{\overline{A}}(n) = \vec{D}(n) \underline{D}^x(n) \quad (5)$$

If the components of vector $\vec{D}(n)$ and $\vec{D}^x(n)$ are indicated by $d(n-i)$ and $d^x(n-j)$ with integers $i$ and $j$ between 0 and $N-1$, the components of the matrix $A(n)$ can be written:

$$(6) \begin{cases} a_{ij}(n) = d(n-i) \cdot d^*(n-j) \\ a_{ii}(n) = |d(n-i)|^2 \end{cases}$$

for $i \neq j$

In the known echo cancellers, the control of the coefficients of the transversal filter is carried out in the same manner, that is to say, by iteration in accordance with the recursion formula (3) or the equivalent formula (4), both during the training period intended to initialize the coefficients as well as during the tracking period in the course of the data transmission. Therefore, during the tracking period a weighting coefficient $\alpha$ is used which is small with respect to 1 in order to prevent the coefficients of the transversal filter from being disturbed by the data signal originating from the remote modem during the full duplex transmission. This results in small corrections of the coefficients and a slow convergence of the echo canceller. At the beginning of the training period it is possible to operate with a greater weighting coefficient $\alpha$, but towards the end of this period it is necessary to operate with a weighting coefficient $\alpha$ of the same order of magnitude as that used during the tracking period. Finally, with an iterative control of the coefficients the convergence of the echo canceller remains slow during the training period.

DESCRIPTION OF THE PREFERRED EMBODIMENTS

The present invention provides a method by which initializing the coefficients is achieved by a training period of reduced duration.

This method is based on a combination of several steps which will now be explained.

In a first step, the coefficients of the transversal filter, instead of being modified at each sampling instant $nT$, are modified at all "L" sampling instants with a modification term which is the average of the L modifications calculated in accordance with the classical formulae (3) or (4). This results in that the algorithm for modifying the coefficients can be written in accordance with a formula derived from formula (3):

$$\vec{C}[(p+1)L] = \vec{C}[pL] + \frac{\alpha}{L} \sum_{n=pL}^{(p+1)L-1} e(n) \cdot \vec{D}^*(n) \quad (7)$$

This algorithm for modifying the coefficients may also be written according to a formula derived from formula (4):

$$\vec{C}[(p+1)L] = \vec{C}[pL] + \alpha/L \cdot \overline{\overline{B}}(pL) \cdot [\vec{k} - \vec{C}(pL)] \quad (8)$$

in which $\overline{\overline{B}}(pL)$ is a matrix of the order N deriving from matrix $\overline{\overline{A}}(n)$ defined by the formula (5):

$$\overline{\overline{B}}(pL) = \sum_{n=pL}^{(p+1)L-1} \overline{\overline{A}}(n) \quad (9)$$

It can then be easily derived from formula (6) giving the components of the matrix $\overline{\overline{A}}(n)$ that the components of the matrix $\overline{\overline{B}}(pL)$ are:

$$(10) \begin{cases} b_{ij} = \sum_{n=pL}^{(p+1)L-1} d(n-i) \cdot d^*(n-j) \\ b_{ii} = \sum_{n=pL}^{(p+1)L-1} |d(n-i)|^2 \end{cases}$$

for $i \neq j$ and $i,j = 0, 1, \ldots, N-1$

A further step in the method according to the invention consists in that for producing the echo signal and for cancelling it, during the training period a periodic data signal $D(n)$ is used with a period $LT$ such that $L \geq N$, where $NT$ is the total delay produced by the transversal filter. This means that the components $b_{ij}$ and $b_{ii}$ of the matrix $\overline{\overline{B}}(pL)$ occur periodically with a period defined by L; they are independent of the variable $p$, if $p \geq 1$. These components may, therefore, be written:

$$(11) \begin{cases} b_{ij} = \sum_{n=0}^{L-1} d\{n-i\} \cdot d^*\{n-j\} \\ b_{ii} = \sum_{n=0}^{L-1} |d\{n-i\}|^2 \end{cases}$$

for $i \neq j$ and $i,j = 0, 1, \ldots, N-1$ where
$\{n-i\} = (n-i)$ modulo L $\{n-j\} = (n-j)$ modulo L It can be shown that owing to the periodicity of the data signal D(n) the components $b_{ii}$ are independent of the index i and have, in accordance with the second formula (10), the value $b_0$ such that:

$$b_0 = \sum_{n=0}^{L-1} |d(n)|^2 \qquad (12)$$

This value $b_0$ of the component $b_{ii}$ can be written in the form:

$$b_0 = L\sigma^2$$

where $\sigma^2$ is the power of each datum of the signal D(n).

It can otherwise be shown that the component $b_{ij}$ only depends on the index difference (i−j) and that $b_{ij} = b^*_{ji}$. The components $b_{ij}$ with a positive difference (i−j) have values $b_i$ such that:

$$b_i = \sum_{n=0}^{L-1} d(n) \cdot d^*|\{n-i\}| \qquad (13)$$

The components $b_{ji}$ with a positive difference (j−i) have values $b_j$ such that $b_j = b^*_i$.

Finally, taking into account these properties of the components of the matrix $\overline{\overline{B}}(pL)$ provided by the periodicity of the data signal D(n), this matrix can be written:

$$B(pL) = \begin{bmatrix} b_0 & b_1 & b_2 & & b_{N-1} \\ b^*_1 & b_0 & b_1 & & \\ b^*_2 & b^*_1 & b_0 & & b_2 \\ & & & & b_1 \\ b^*_{N-1} & & b^*_2 & b^*_1 & b_0 \end{bmatrix}$$

A further step of the method according to the invention consists in using a data signal D(n) such that the values $b_i$ of the components $b_{ij}$ of the matrix $\overline{\overline{B}}(pL)$ as provided by the formula (13) are zero for $i \neq 0$ and $i = 1, 2, \ldots, N-1$. This property of the signal D(n) can thus be written:

$$\sum_{n=0}^{L-1} d(n) \cdot d^*[\{n-i\}] = 0 \qquad (14)$$

for $i \neq 0$ and $i = 1, 2, \ldots N - 1$

This property (14) means that the autocorrelation function of a datum signal D(n) between the data and the complex conjugate datum is zero when their phase shift measured modulo LT is T, 2T, ... (N−1)T. When this phase shift is zero or a multiple of LT, the autocorrelation function assumes a maximum value corresponding with the value $b_0 = L\sigma^2$ for each element of the diagonal of the matrix $\overline{\overline{B}}(pL)$.

Of course, if the data signal D(n) is chosen so that its autocorrelation function is zero for any phase shift differing from zero and the multiples of LT, the required property (14) is respected strictly, since L is chosen to be L>N.

With a periodic data signal satisfying condition (14), all components of the matrix $\overline{\overline{B}}(pL)$ are zero with the exception of those of the diagonal, which have the value $b_0 = L\sigma^2$. Therefore, this matrix $\overline{\overline{B}}(pL)$ is equal to the product of $L\sigma^2$ and $II_N$ where $II_N$ is the identity matrix.

The formula (8) giving the algorithm for modifying the coefficients can then be written:

$$\vec{C}[(p+1)L] = \vec{C}(pL) + \alpha\sigma^2[\vec{k} - \vec{C}(pL)] \qquad (15)$$

$$\vec{C}[(p+1)L] = \vec{C}(pL)[1 - \alpha\sigma^2] + \alpha\sigma^2\vec{k}$$

If the weighting coefficient $\alpha$ is chosen such that $$\alpha = 1/\sigma^2$$

the formula (15) becomes $$\vec{C}[(p+1)L] = \vec{k} \qquad (16)$$

Therefore, irrespective of the value of the coefficients $\vec{C}(pL)$ of the transversal filter at an instant pLT, the optimum value of these coefficients $\vec{C}[(p+1)L]$ at an instant (p+1)LT can be obtained, which value is equal to the samples $\vec{k}$ of the impulse response of the echo path and permits of cancelling the echo signal by carrying out the calculation given by the formula (7) under the conditions indicated above in detail. Since the remote modem does not transmit any data signal, the operations to be performed in the local modem may be summarized as follows:

Transmission of a periodic training data signal D(n) satisfying the property (14); since the period LT of this data signal is such that $L \geq N$, the transversal filter providing a delay NT cannot store more than one period of the data signal, Calculation of the coefficients of the transversal filter according to formula (7) by choosing a weighting coefficient $\alpha$ such that $\alpha = 1/\sigma^2$, where $\sigma^2$ corresponds to the constant power of each datum of the signal D(n). As formula (7) shows, the coefficients $\vec{C}[(p+1)L]$ are obtained by a single modification of the coefficients $\vec{C}[pL]$, this modification resulting from the calculation, during a period LT, of the sum of the products $e(n) \cdot \vec{D}^x(n)$ calculated at each instant nT of the period.

As is shown in the foregoing, the resultant coefficients $\vec{C}[(p+1)L]$ have, after this unique modification, the optimum values $\vec{k}$, which permits the cancelling of the echo signal.

Since the method according to the invention is in fact used for training the echo canceller, it is easier to write the formula (7) for the period of the duration LT of the simulated signal such that p=0. With $\alpha = 1/\sigma^2$, the formula (7) then becomes:

$$\vec{C}(L) = \vec{C}(0) + \frac{1}{L\sigma^2} \cdot \sum_{n=0}^{L-1} e(n) \cdot \vec{D}^*(n) \qquad (17)$$

In order to avoid noise in the coefficients due to non-infinite precision of the calculation, it is preferred to make the coefficients $\vec{C}(0)$ at the beginning of the calculation period equal to zero so that in this practical case the coefficients C(L) obtained at the end of this period are formed in accordance with the expression:

$$\vec{C}(L) = \frac{1}{L\sigma^2} \cdot \sum_{n=0}^{L-1} e(n) \cdot \vec{D}^*(n) \qquad (18)$$

In the case concerned, in which the coefficients $\vec{C}(0)$ are zero, the input signal $\epsilon(n)$ of the transversal filter remains zero during the whole calculation period so that during this period $e(n)=\epsilon(n)$. Therefore, the coefficients of the filter may also be calculated in accordance with the expression:

$$\vec{C}(L) = \frac{1}{L\sigma^2} \sum_{n=0}^{L-1} \epsilon(n) \cdot \vec{D}^*(n) \qquad (19)$$

In the method according to the invention described above, the calculation of the coefficients of the transversal filter is carried out in a single period of duration LT of the data signal used for the training the echo canceller. As a matter of course, in order to obtain the optimum coefficients from said calculation, it is necessary for the echo signal produced in response to the training signal D(n) to be present at the input of the difference circuit of the echo canceller at the instant of calculation. In order to obtain the optimum coefficients, the training signal has to be first transmitted during the time required for the excitation of the echo path, which is in fact equal to the delay NT provided by the transversal filter, when the latter is dimensioned most correctly, and then during the calculation period LT of the coefficients. By the method according to the invention the convergence time of the echo canceller, as measured from the instant of starting the transmission of the training sequence, can, therefore, be reduced to (L+N)T and to the minimum value 2NT if L=N. In the latter case, in order to cancel, for example, an echo of 20 msec, the required time is 40 msec, as compared with a convergence time in the order of a second obtained by the prior art echo cancellers.

It can be noted that in a general case in which the data signal D(n) is complex, the relation (14) defining the property of this signal to be satisfied is expressed by two relations to be simultaneously satisfied and concerning, respectively, the real part and the imaginary part of the first term of the relation (14). With respect to the choice of the training signal satisfying these relations, it is preferred to use data values which are normally transmitted by a modem and which have values such as 0, ±1, ±j, ±√2, ±j, √2, etc. A training signal satisfying the relation (14) and comprising 16 elements in one period may be formed with the aid of the sequence: 1, 1, 1, 1, 1, j, −1, −j, 1, −1, 1, −1, 1, −j, −1, j.

With a training data signal D(n) satisfying the property defined by relation (14) cancellation of the echo signal is obtained in the manner described without any limitation regarding the spectrum of this signal. In particular, such a training signal is suitable for cancelling an echo signal which may or may not comprise a d.c. component. The case of an echo comprising a d.c. component occurs, for example, in an echo canceller used in a baseband transmission modem or in the case in which the echo cancellation is carried out after the demodulation of a signal transmitted by carrier modulation. The case of an echo without d.c. component occurs, for example, in the system represented in FIG. 1, where the echo is produced in response to a carrier modulated signal and cancelation is performed directly on the received signal prior to its demodulation.

In a case as shown in FIG. 1, in which the echo signal does not comprise a d.c. component, a variant of the invention uses a periodic training signal D(n), which instead of satisfying condition (14), satisfies the condition:

$$\sum_{n=0}^{L-1} d(n) \cdot d^*[\{n - i\}] = -1 \qquad (20)$$

for $i \neq 0$ and $i = 1, 2, \ldots, N - 1$

This condition (20) can, in particular, be satisfied with the aid of data sequences known as maximum length sequences, whose autocorrelation function, apart from a constant factor, has the value −1 for any shift differing from zero and multiples of the period LT of the sequence and has the value L for a shift zero or a multiple of LT.

If a training signal D(n) satisfying this condition (20) is used, the matrix $\overline{\overline{B}}(pL)$ has its components $b_o$ on the diagonal still equal to $L\sigma^2$, whereas all other components are equal to −1. It can be shown that in this case, when formula (8) for calculating the coefficients is applied with $\alpha = 1/\sigma^2$ and $\vec{C}(pL) = 0$ (coefficient initialized at zero), the result is:

$$\vec{C}[(p+1)L] = \vec{k} - \frac{1}{L\sigma^2} \vec{d}$$

In this expression $\vec{d}$ is a vector, all N components of which are equal to $k_0 + k_1 + \ldots + k_{N-1}$, that is to say, to the sum of the components of the vector $\vec{k}$. This vector $\vec{d}$ thus represents the d.c. component of the impulse response of the echo path. The echo signal can only be cancelled when $i\vec{C}[(p+1)L] = \vec{k}$.

Therefore, in order for a training signal satisfying condition (20) to permit cancellation of the echo, this echo must not comprise a d.c. component.

It will generally be assumed hereinafter that the training signal satisfies condition (14), which is convenient for all cases, it being understood that it may also satisfy condition (20) when the echo signal does not comprise a d.c. component.

Figure 2:
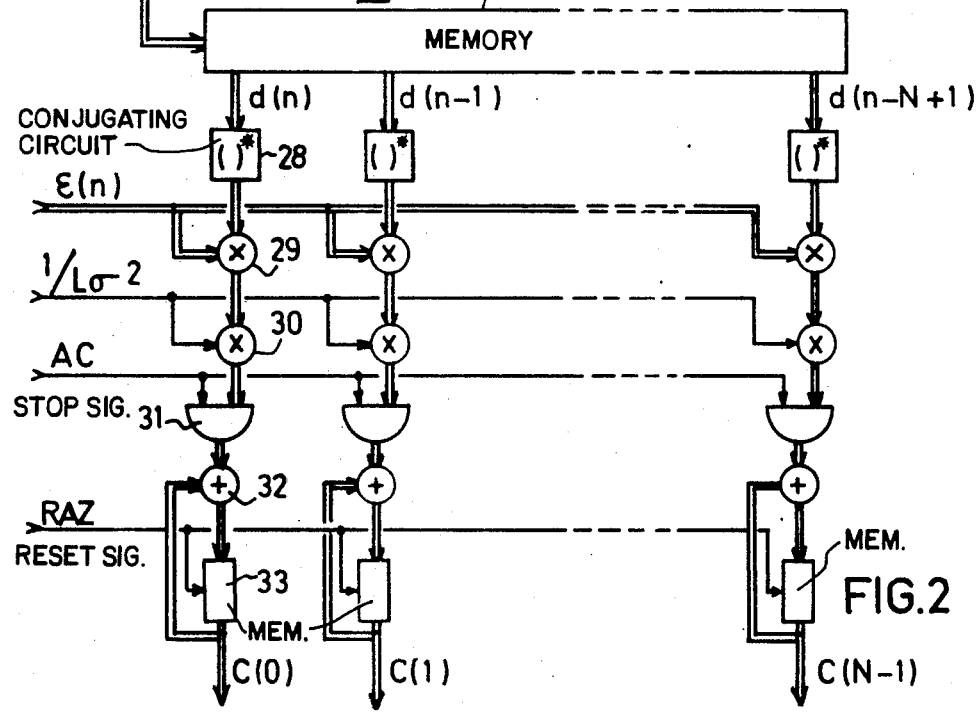
FIG. 2 shows an embodiment of a coefficient control circuit for calculating the coefficients of the transversal filter in FIG. 1 in accordance with the invention.
Figure 3:
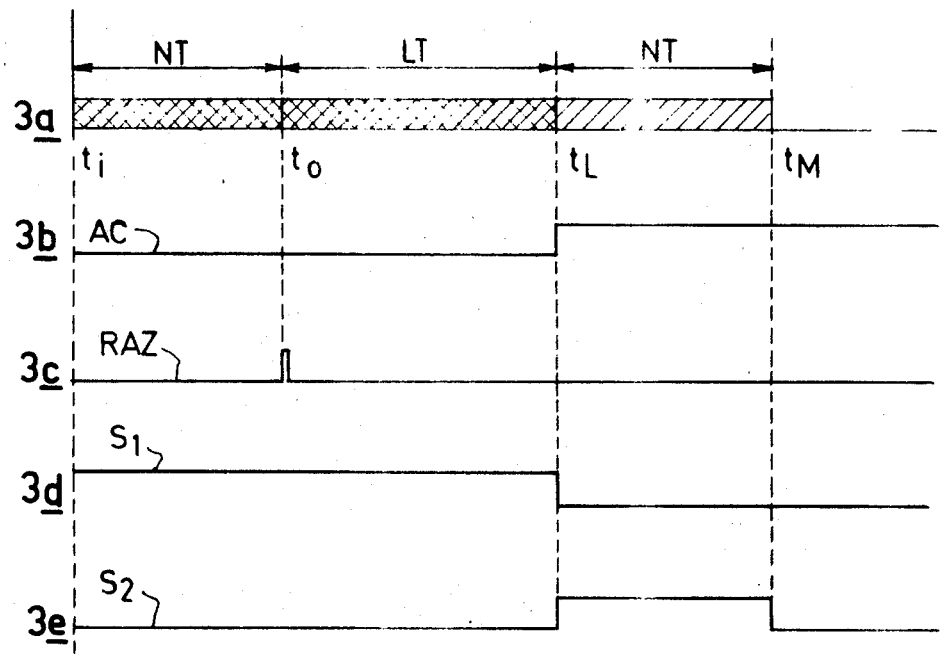
FIG. 3 shows a signal diagram for explaining the operation of the coefficient control circuit for calculating the coefficients of the transversal filter in FIG. 1.

FIG. 2 shows a possible configuration for the circuit 16 in FIG. 1 for calculating the coefficients of the transversal filter 15 during the training period of an echo canceller using the method according to the invention, while the signal diagrams 3a to 3c of FIG. 3 are intended to explain the operation thereof.

FIG. 2 shows a generator 25 supplying a complex training signal D(n) of a period LT having the autocorrelation properties as explained above. During the training period the generator 25 is connected to the transmit path 1 of the modem through the assembly of the circuits 11, 12, 13 supplying the modulated carrier signal, and is also connected, to the input of a memory 26 arranged to supply in parallel at N outputs the N last samples of the signal applied to its input for a duration NT. This memory 26 may be the one which is normally used in the transversal filter 15 of the echo canceller in FIG. 1. In the diagram 3a of FIG. 3 the double-crosshatched zone represents the time during which, in the configuration of FIG. 2, the training signal D(n) is supplied to the transmit path 1 of the modem and to the memory 26, starting from an initial instant $t_i$. There will be considered the general case in which the period LT of the training signal exceeds the storage time NT of the memory 26, which time NT is at least equal to the excitation time of the echo path. From the time $t_0 = t_i + NT$ it is ensured that the echo signal $\epsilon(n)$ is present in the receive path 3 of the modem. The calculation circuit of FIG. 2 permits of calculating the N coefficients of the transversal filter 15 during the period LT of the training signal extending from the instant $t_0$ to the instant $t_L = t_0 + LT$. This coefficient calculating circuit comprises N identical circuits which are connected to the N outputs of the memory 26 to receive at a given instant nT the respective samples d(n), d(n−1), . . . d(n−N+1) of the training signal and which supply the N respective coefficients C(0), C(1), . . . , C(N−1) at the end of the calculation period.

The circuit calculating the coefficient C(0), for example, comprises a circuit 28 forming the complex conjugate value d*(n) of the sample d(n) of the training signal. This complex conjugate value is multiplied in a multiplier 29 by the echo signal ε(n), it being supposed that formula (19) is used. Each resultant product ε(n)·d*(n) is applied to a multiplier 30, in which it is multiplied by the constant factor $1/L\sigma^2$. The output signal of the multiplier 30 is applied to a gate 31 which may be blocked by a signal AC stopping the calculation, as will be explained hereinafter. The output of the gate 31 is connected to an accumulator formed by a memory 33 and an adder 32. The contents of memory 33 can be reset to zero by a signal RAZ and supplies the coefficient C(0) of the transversal filter at the end of the calculation period. The other coefficient calculating circuits use in the same manner the echo signal ε(n), the constant factor $1/L\sigma^2$ and the control signals AC and RAZ.

A coefficient calculating circuit, such as the circuit supplying the coefficient C(0), operates as follows: The control signals AC and RAZ have the form shown in the diagrams 3b and 3c of FIG. 3. The calculation stop signal AC is low until the instant $t_L$ and up to this instant it permits the application of the output signal of the multiplier 30 through the gate 31 to the accumulator 33, 32. However, the effective calculation of the coefficients only starts at the instant $t_0$, at which a pulse appears in the signal RAZ which resets memory 33 of the accumulator to zero. Starting from this instant $t_0$, the accumulator forms the sum of the terms $\epsilon(n)\cdot d^*(n)\cdot 1/(L\sigma^2)$ supplied by the multiplier 30 and at the instant $t_L = t_0 + LT$ this sum formed in the accumulator constitutes the coefficient C(0). At the instant $t_L$ the calculation stop signal AC becomes high and blocks gate 31 so that after the instant $t_L$ the calculated coefficient C(0) remians available at the output of the accumulator memory in order to be used in the transversal filter 15. The other coefficients C(1) to C(N−1) of the transversal filter are calculated in the same manner during the period of time from $t_0$ to $t_L$ and after the instant $t_L$ they are simultaneously available for use in the transversal filter.

After the training period, which has thus permitted initial setting of the coefficients of the transversal filter of the echo canceller, the training signal generator 25 of the training sequence is disconnected and the modem is in configuration of FIG. 1 to transmit the useful data. During data transmission the coefficients of the transversal filter 15 of the echo canceller can be controlled by known processes generally consisting in iteratively modifying the coefficients in accordance with the recursion formula (3) mentioned above. It will readily be seen that the circuits described with reference to FIG. 2, which permit of calculating the coefficients during the training period, also permits of controlling the coefficients during data transmission, if the AC signal permanently remains low in order to keep gate 31 conducting and if the contents of the accumulator are not reset to zero by the signal RAZ, while the constant factor α may be adjusted to a value differing from the value $1/L\sigma^2$ used during the training period.

Figure 4:
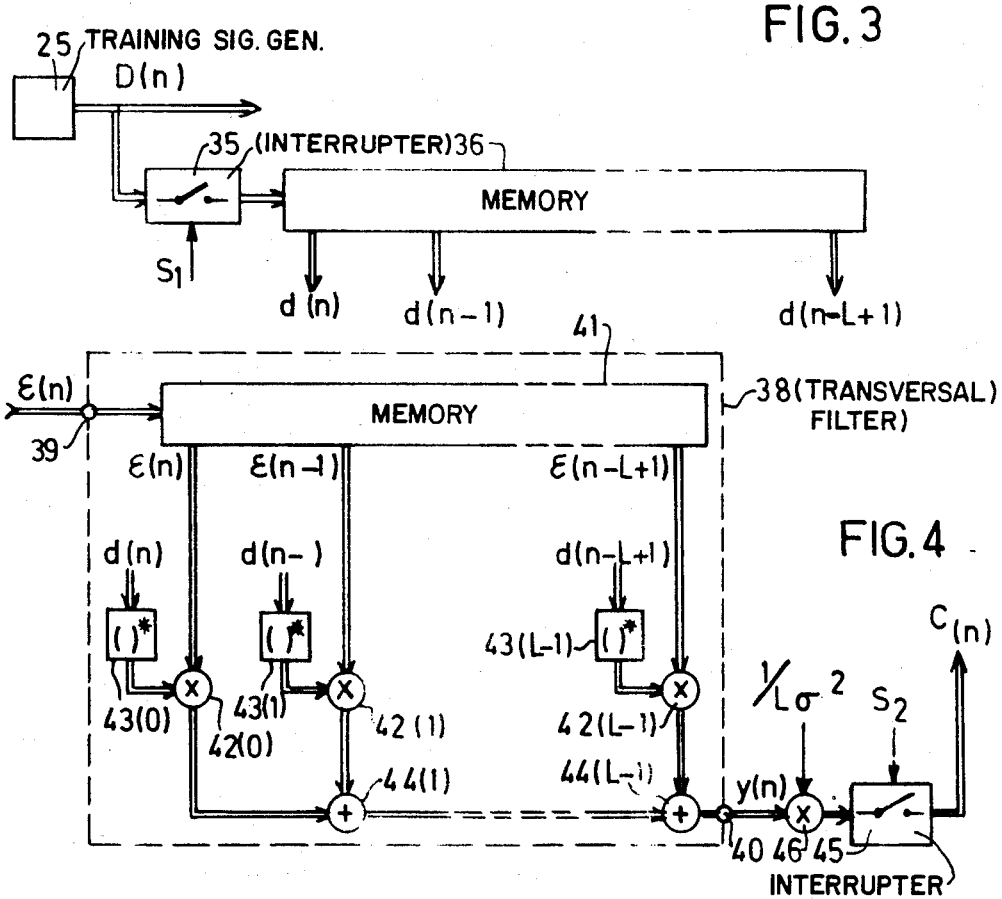
FIGS. 4 and 5 show two further embodiments of transversal filter coefficient control circuits for calculating the filter coefficients in accordance with the invention.

FIG. 4 shows another possible configuration of a circuit for calculating the coefficients of the transversal filter 15 during the training period. Instead of supplying these coefficients simultaneously the circuit of FIG. 4 supplies the coefficients successively.

In FIG. 4 the generator 25 for supplying the training signal D(n) is connected, during the training period, to the transmit path 1 of the modem, as shown in FIG. 2, and also connected through an interrupter 35 to the input of a memory 36 arranged to supply in parallel at L outputs the L last samples of the signal applied to its input. In the case that L=N, memory 36 may be completely constituted by a memory arranged for N samples, with which the transversal filter 15 is normally provided. The interrupter 35, first being assumed to be closed, is opened by a control signal $S_1$ at an instant to be defined hereinafter, in a manner such that at the L outputs of memory 36 the samples d(n), d(n−1), . . . d(n−L+1) of the training signal remain available.

The coefficient calculating circuit in FIG. 4 takes the form of a transversal filter 38, whose input 39 receives the echo signal ε(n) and whose output 40 supplies a signal y(n) which serially establishes the successive N coefficients in series of the transversal filter 15 of the echo canceller during a well-defined time interval NT. The samples of the echo signal ε(n) are applied to the input of a memory 41 arranged to supply in parallel at L outputs the L last samples of the signal applied to its input. At the instant at which the interrupter 35 is open, the samples appearing at the L outputs of memory 41 are ε(n), ε(n−1), . . . ε(n−L+1). These samples are respectively applied to an input of multipliers 42(0), 42(1), . . . , 42(L−1), the other input of which receives the complex conjugate values d*(n), d*(n−1), . . . , d*(n−L+1) of the samples of the training signal available at the L outputs of memory 36. These complex conjugate values constitute the coefficients of the transversal filter 38. They are respectively formed with the aid of circuits 43(0), 43(1), . . . 43(L−1). The samples at the outputs of the multipliers 42(0), 42(1), . . . 42(L−1) are summed with the aid of the chain of adders 44(1) . . . 44(L−1). At the output of this chain the output signal y(n) of the transversal filter 38 is obtained. This signal y(n) is applied to a multiplier 46 to be multiplied by the constant factor $1/(L\sigma^2)$. The product of y(n) and $1/(L\sigma^2)$ is then applied to an interrupter 45, which under the control of a signal $S_2$ provides for a time window of duration NT, during which N successive samples are obtained which constitute the N coefficients C(n) of the transversal filter 15 of the echo canceller.

The timing conditions which enable this result may be understood with the aid of the diagrams 3d and 3e of FIG. 3, respectively representing the control signals $S_1$ and $S_2$ for controlling the closure of the interrupters 35 and 45. From the initial instant $t_i$ to the instant $t_L$ the interrupter 35 is closed by the control signal $S_1$ and the interrupter 45 is opened by the control signal $S_2$. At the instant $t_0$, the echo signal begins appearing at the input 39 of memory 41 and during the period LT of the training signal from $t_0$ to $t_L$, memory 41 stores samples of the echo signal, whereas memory 36 stores samples of the training signal. At the instant $t_L$, the interrupter 35 opens under the control of signal $S_1$ and L samples d(n) to d(n−L+1) retain stored in memory 36. At the instant $t_L$, the interrupter 45 closes under the control of signal $S_2$. Just after the instant $t_L$, the filter 38 calculates a first sample of signal y(n) such that $$y(n) = \sum_{m=0}^{L-1} \epsilon(n-m) \cdot d^*(n-m)$$

This first sample of signal y(n) multiplied by the factor $1/(L\sigma^2)$ constitutes the first coefficient C(0) of the transversal filter 15 of the echo canceller which is transferred by the interrupter 45. This circuit remains open for a period of duration NT from the instant $t_L$ to the instant $t_M$. For this entire period represented by the single-crosshatched zone in diagram 3a the transversal filter 38 uses the same coefficients $d^*(n)$ to $d^*(n-L+1)$ and after each instant $t_L+iT(0 \leq i \leq N-1)$ the filter 38 calculates a sample y(n+i) such that $$y(n+i) = \sum_{m=0}^{L-1} \epsilon(n+i-m) \cdot d^*(n-m)$$

The samples y(n) to y(n+N−1) supplied by filter 38 and multiplied by the constant factor $1/(L\sigma^2)$ are transferred by the interrupter 45 until the instant $t_M$ to form the N coefficients C(0) to C(N−1) of the transversal filter 15 of the echo canceller. It will be noted that with the configuration of FIG. 4 the time $t_M$ required to obtain these N coefficients in succession exceeds by NT the time $t_L$ required in the configuration of FIG. 2 to obtain the N coefficients in parallel.

Figure 5:
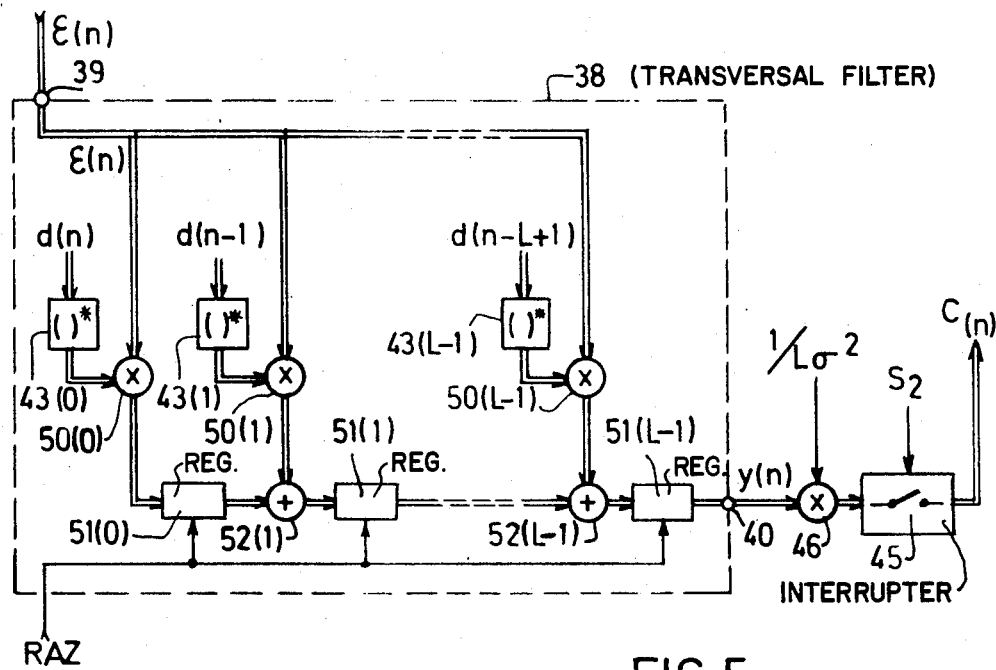

In the configuration of the coefficient calculating circuit of FIG. 4, the transversal filter 38 may be constructed, alternatively in accordance with the diagram shown in FIG. 5 which is known per se. In FIG. 5 the elements having the same function as those of FIG. 4 are designated by the same reference numerals. In FIG. 5 each sample ε(n) of the echo signal is directly applied to L multipliers 50(0) to 50(L−1), which also receive the complex conjugate values of the samples d(n) to d(n−L+1) of the training signal from circuits 43(0) to 43(L−1). As is indicated in FIG. 4, these samples are formed at the outputs of memory 36. The filter 38 also comprises L memory registers 51(0) to 51(L−1) each of which provides a delay T with respect to their input samples. The output samples of the registers 51(0) to 51(L−1) are respectively applied to an input of respectively L−1 adders 52(1) to 52(L−1). The output of multiplier 50(0) is connected to the input of register 51(0). The outputs of multipliers 50(1) to 50(L−1) are respectively connected to another input of the respective adders 52(1) to 52(L−1). The output of adder 52(L−1) is connected to the output terminal 40 of the transversal filter 38 through the register 51(L−1). The output signal y(n) of this transversal filter is processed in the same manner as in FIG. 5, that is to say, it is multiplied by the constant factor $1/(L\sigma^2)$ with the aid of circuit 46, after which it is applied to interrupter 45, the closure of which is controlled by signal $S_2$.

With a filter 38 constituted is in FIG. 5, the memory registers 51(0) to 51(L−2) have to be reset to zero by a pulse of the signal RAZ indicated in diagram 3c and produced at the instant $t_0$. During the time interval LT from the instant $t_0$ to the instant $t_L$, partial results appear at the output 40 of transversal filter 38 but are not used since the interrupter 45 is then open. During the time interval NT from the instant $t_L$ to the instant $t_M$, complete results of the calculation appear at the output 40 of filter 38 and at the output of the interrupter 45, which is then closed, so that the N coefficients C(0) to C(N−1) of the transversal filter 15 of the echo canceller can then be determined.

So far it has been assumed that the method according to the invention and the corresponding calculation circuits are used in a local modem in the absence of any signal from a remote modem, that is to say under the conditions actually imposed by CCITT for the training period of the echo canceller. However, a version of the method according to the invention using similar circuits also permits reducing the convergence time of an echo canceller when a data signal is received which originates from a remote modem.

There will first be considered the case in which the remote modem transmits an arbitrary data signal, whilst the local modem tries to recover a lost echo cancellation. This situation may occur, for example, when the coefficient control circuit of the echo canceller has not correctly operated during a full duplex transmission and when it is not possible to stop the transmission of data by the distant modem. In this case, the signal ε(n) applied to the difference circuit 17 of the echo canceller has not only the value of the echo signal $\vec{D}(n)\cdot\vec{k}$ as indicated in formule (2), but it has the value:

$$\epsilon(n) = \vec{D}(n)\cdot\vec{k} + b(n) \tag{21}$$

In this expression for ε(n), b(n) is an additive noise term provided by the data signal originating from the distant modem.

When using the method according to the invention, in carrying out the calculation in accordance with formula (19) for obtaining the coefficients C(L) of the transversal filter 15 of the echo canceller, instead of the coefficients $\vec{C}(L)=\vec{k}$ permitting precise cancellation of the echo signal, the following coefficients will be obtained with a signal ε(n) according to formula (21):

$$\vec{C}(L) = \vec{k} + \frac{1}{L\sigma^2} \sum_{n=0}^{L-1} b(n) \cdot \vec{D}^*(n) \tag{22}$$

The noise b(n) in the signal ε(n) becomes manifest as a noise signal $\Delta\vec{C}$ in the coefficients of the transversal filter 15 of the echo canceller, which noise $\Delta\vec{C}$ is equal to the second term of the expression for the coefficients in formula (22). When $\sigma_b^2$ represents the square error of the noise b(n), the mean square error of the noise $\Delta\vec{C}$ in the coefficients can be written:

$$E[|\Delta\vec{C}|^2] = \frac{1}{L^2\sigma^2} \cdot L \cdot \sigma_b^2 \cdot N = \frac{N}{L} \cdot \frac{\sigma_b^2}{\sigma^2}$$

Therefore, the noise component C of the coefficients produces at the output of the difference circuit 17 a residual echo signal ê(n), the mean square error of which is:

$$E[|\hat{e}(n)|^2] = E[|\Delta\vec{C}|^2] \cdot \sigma^2 = \frac{N}{L} \cdot \sigma_b^2$$

It may be inferred that the ratio R of the power of the residual echo ê(n) to the power of the noise b(n) produced by the remote modem is:

$$R = \frac{E[|\hat{e}(n)|^2]}{\sigma_b^2} = \frac{N}{L} \tag{23}$$

This formula (23) permits of fixing the duration LT of the training signal to be taken into account in calculating the coefficients of the transversal filter 15 in order to obtain a given ratio R. In order to obtain, for example, a residual echo $\hat{e}(n)$ whose power exceeds by 20 dB the power of the noise b(n), R=N/L=1/100 or L=100N has to be chosen. The duration LT may be the effective period of the training signal, which may be very long, for example when L=100N. In order to avoid the necessity of forming a training signal having a very long period, there may also be used a training signal of shorter period, for example, of a duration $L'T=NT$, taking into account for the calculation of the coefficients a time interval of a duration LT which is a multiple of L'T and corresponds to the ratio chosen.

In the method according to the invention as described above for the case in which the distant modem transmits an arbitary data signal, the coefficients of the transversal filter of the echo canceller are calculated by integration of correction terms of the coefficients for a duration LT which is sufficiently long for the residual echo to attain a desirable small value. In a variant of the invention used for the same case, a training signal is used which has a period LT equal to NT and also has the autocorrelation properties defined above. However, the coefficients of the transversal filter of the echo canceller are modified in several successive steps, during each of which the calculated corrections are integrated for a duration LT=NT before being effectively applied to the coefficients. The modifications of the coefficients after each step p, are performed in accordance with the recursion formula (7) with $\alpha=1/\sigma^2$, the coefficients being initialized at zero value at the beginning of the first step p=0, which means using the formula (18) for calculating the coefficients during this first step. The various variants of the invention applied in the case in which the remote modem transmits an arbitrary data signal, provide convergence times of the echo canceller of the same order of magnitude.

The method according to the invention applied to a training period preceding the transmission of the data permits, by using a particular training signal, of obtaining a rapid convergence of the echo canceller of the local modem provided the distant modem does not transmit any signal; starting from an initial instant $t_i$, at which the transmission of the training signal begins, the convergence time may be reduced to the value 2NT. In order to cause the echo cancellers of two modems of a duplex connection to converge, the method so far described has to be successively applied to these echo cancellers, which at least doubles the convergence time for the whole connection and requires a particular procedure that cannot always be carried into effect.

A variant of the invention permits of avoiding these difficulties by allowing duplex convergence of the two echo cancellers of a connection by means of other properties of the training signals transmitted by both modems.

As in the foregoing descriptions D(n) designates the vector of N components characteristic of the samples of the training data signal D(n) transmitted by the local modem and $\vec{k}$ designates the vector of N components characteristic of the samples of the impulse response of the echo path for the local modem. For the remote modem, $\vec{G}(n)$ designates the vector of N components characterizing the samples of a training signal G(n). Each datum of the signal G(n) at an instant nT has the value g(n). On the other hand, the samples of the impulse response of the path between the distant modem and the local modem are characterized by the vector $\vec{h}$ of N components.

Under these conditions the signal $\epsilon(n)$ appearing at the (+) input of the difference circuit 17 of the echo canceller is written:

$$\epsilon(n) = \underline{D}(n) \cdot \vec{k} + \underline{G}(n) \cdot \vec{h}$$

It will now be assumed that the signals D(n) and G(n) have the properties already described above, that is to say, they are periodical with a period LT and have the autocorrelation properties of the kind defined by formula (14). When the coefficients of the transversal filter of the local echo canceller are calculated by integration over a period LT according to formula (19), the value for these coefficients is found to be:

$$\vec{C}(L) = \vec{k} + \frac{1}{L\sigma^2}\left[\sum_{n=0}^{L-1} \vec{D}^*(n) \cdot \underline{G}(n)\right] \cdot \vec{h} \tag{24}$$

The coefficients $\vec{C}(L)$ calculated in this manner differ from the desired values $\vec{k}$ by a quantity depending on the matrix F such that $$\overline{\overline{F}} = \sum_{n=0}^{L-1} \vec{D}^*(n) \cdot \underline{G}(n)$$

The matrix $\overline{\overline{F}}$ is a square matrix of the order N, the components of which are:

$$\begin{cases} f_{ij} = \sum_{n=0}^{L-1} d^*(n-i) \cdot g(n-j) \\ f_{ii} = \sum_{n=0}^{L-1} d^*(n-i) \cdot g(n-i) \end{cases}$$

for $i \neq j$ and $i,j = 0,1,\ldots,N-1$

Since the signals D(n) and G(n) have the same period LT, the components $f_{ij}$ and $f_{ii}$ can be written:

$$\begin{cases} f_{ij} = \sum_{n=0}^{L-1} d^*\{n-i\} \cdot g\{n-j\} \\ f_{ii} = \sum_{n=0}^{L-1} d^*\{n-i\} \cdot g\{n-i\} \end{cases} \tag{25}$$

In formula (25) the braces {·} mean that the quantities between them are taken modulo L.

It will now be assumed that the training signals D(n) and G(n) of the same period have, in addition to the above autocorrelation properties, the property of being completely decorrelated relative to one another. This additional property becomes manifest by the fact that:

$$\sum_{n=0}^{L-1} d^*\{n-i\} \cdot g\{n-i'\} = 0 \text{ for } i,i' \, i = 0,1,\ldots,N-1 \tag{26}$$

This propery (26) is obtained, for example, when G(n) is a delayed version of D(n) or the time-inverted version of D(n).

When the training signals D(n) and G(n) have the property (26), all components $f_{ij}$ and $f_{ii}$ of the matrix $\overline{F}$ are zero so that according to formula (24) the coefficients $\vec{C}(L)$ of the local echo canceller assume the desired values $\vec{k}$ of the impulse response of the echo path of the local modem. When the two echo cancellers of a connection simultaneously operate in this manner with two training signals D(n) and G(n) completely decorrelated relative to one another at the point of the signal received in each modem, the coefficients of the two echo cancellers are simultaneously obtained after a period LT of integrating the corrections of the coefficients.

If for the two modems at the ends of a connection the echo signal does not comprise a d.c. component, periodic training signals D(n) and G(n) can be used which satisfy the autocorrelation property (20) and, in addition, the extra property:

$$\sum_{n=0}^{L-1} d^*\{n-i\} \cdot g\{n-i'\} = -1$$

for $i,i' = 0, 1, \ldots, N-1$

So far it has been assumed that the sampling frequency $f_e$ in the receive path 3 of the modem in FIG. 1 is equal to the modulation frequency 1/T, that is to say, the sampling frequency of the data in the training signal such as D(n). Now, normally the sampling frequency $f_3$ is a multiple of the frequency 1/T. An echo canceller using the method according to the present invention with a sampling frequency $f_e$ such that $f_e = q \cdot 1/T$ and receiving the data signal D(n) sampled at the frequency 1/T has to be arranged for calculating q sets of coefficients of the transversal filter. A first step consists in causing the echo canceller to operate in time-sharing to calculate these q sets of coefficients during a single integration period LT. A second step requiring less rapid circuits consists in successively calculating the q sets of coefficients. The calculation of each set requires an integration period LT so that the total convergence time of the echo canceller becomes qLT.

The method according to the invention can be carried out with a training sequence D(n) having the particular properties defined above by using a sign-algorithm, the coefficients of the transversal filter being modified in several successive steps during each of which the calculated corrections are integrated for a duration LT before being effectively applied to control the coefficients. Such modifications of the coefficients after each step p are then performed in accordance with the following recursion formula, derived from formula (7):

$$\vec{C}[(p+1)L] = \vec{C}(pL) + \frac{1}{L\sigma^2} \sum_{n=pL}^{(p+1)L-1} \text{sign}[e(n) \cdot \vec{D}^*(n)]$$

At the beginning of the first step such that p=0, the coefficients are initialized at zero value. It will readily be seen that with the sign-algorithm the coefficients are not obtained with sufficient precision. The procedure is, therefore, repeated during a certain number of steps until the coefficients are obtained with the desired precision. The use of the sign-algorithm in the method according to the invention thus raises the convergence time of the echo canceller, but it permits an important simplification of the calculating circuits.

Figure 6:
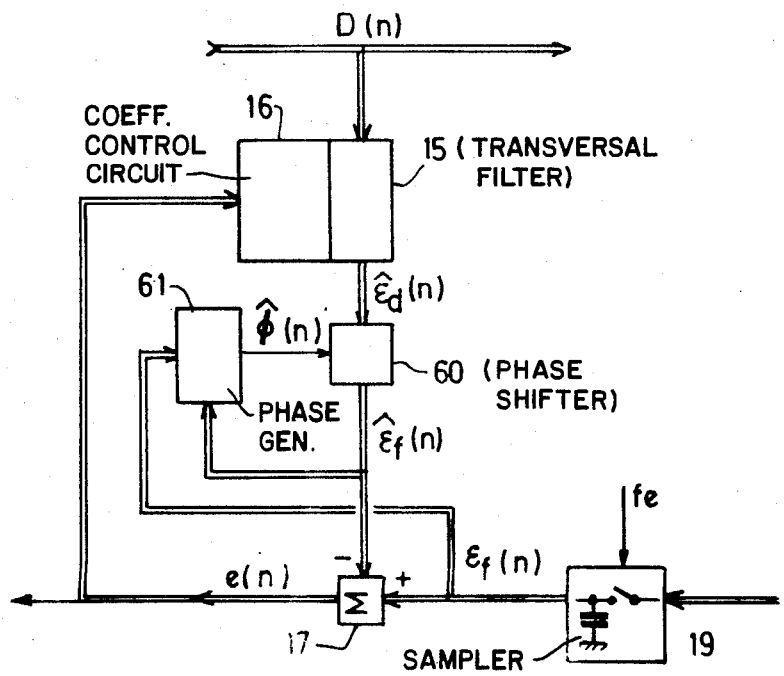
FIG. 6 shows the general circuit structure of an echo canceller in accordance with the invention for echoes subjected to frequency off-set.

So far there has been described the application of the method according to the invention to a linear echo canceller, that is to say, designed to cancel an echo signal only resulting from linear operations in the echo path. However, there may also be non-linear echoes, in particular, in certain carrier current transmission systems which produce an echo signal affected by a carrier frequency off-set with respect to the carrier frequency of the transmitted signal. A linear echo canceller is poorly adapted to correct such an echo signal, the phase of which is variable with the frequency off-set. There are known echo cancellers designed to cancel echo signals having frequency off-set, for example, as described in French Patent Application 8006748, filed Mar. 26, 1980 in the name of Applicant. These echo cancellers generally comprise a circuit which produces, starting from the received signal, a simulated phase of the echo signal, which simualted phase serves for phase correction, in the suitable direction, of the received echo signal or of the echo copy signal produced by the transversal filter. FIG. 6 shows by way of example the general possible structure of a canceller for an echo having frequency off-set. The elements having the same functions as in FIG. 1 are designated in the same manner. FIG. 6 shows the difference circuit 17 receiving at its (+) input the echo signal $\epsilon_f(n)$ affected by frequency off-set and at its (−) input the echo copy signal $\hat{\epsilon}_f(n)$. The echo signal $\epsilon_f(n)$, by using the vectorial notation, can be written:

$$\epsilon_f(n) = \vec{D}(n) \cdot \vec{k} \cdot \exp j\phi(n) \qquad (27)$$

where $\phi(n)$ represents the phase of the echo signal.

In order to obtain the echo copy signal $\hat{\epsilon}_f(n)$ a transversal filter 15 is used, the coefficients of which are determined in the coefficient control circuit 16, and a phase-shifting circuit 60, which modifies by $+\hat{\phi}(n)$ the phase of the output signal signal $\hat{\epsilon}_d(n)$ of the filter 15, where $\hat{\phi}(n)$ is the simulated phase of the echo signal supplied by a phase generator 61, which phase modification is performed by forming the product $\hat{\epsilon}_d(n) \cdot \exp j\hat{\phi}(n)$. The coefficients are determined in circuit 16 starting from the difference signal e(n) or the received echo signal $\epsilon_f(n)$. The simulated phase $\hat{\phi}(n)$ is determined in the generator 61 starting from the signal e(n) or $\epsilon_f(n)$, and from the signal $\hat{\epsilon}_f(n)$ supplied by the phase-shifting circuit 60 so that it is equal to the phase $\phi(n)$ of the echo signal.

The method according to the invention can be applied to an echo canceller of the kind set forth, the echo copy signal $\hat{\epsilon}_f(n)$ them being obtained in two steps, one providing the coefficients of the transversal filter 15, the other providing the simulated phase of the echo signal.

Figure 7:
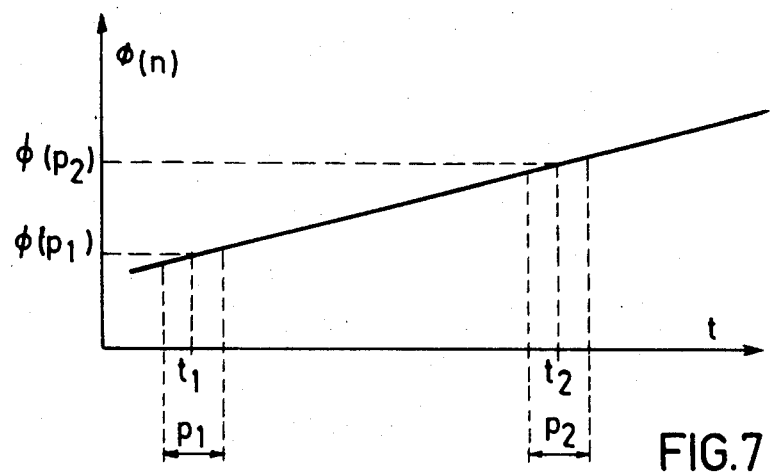
FIG. 7 represents as a function of time the phase of an echo signal with frequency off-set to illustrate the method of the invention applied to a canceller for echoes subjected to frequency off-set.

This two-step method will be described with reference to FIG. 7 illustrating the variation as a function of time of the phase $\phi(n)$ of an echo signal with frequency off-set; this phase variation may be considered to be linear. The first step consists in calculating in circuit 16 the coefficients of the transversal filter 15 by carrying out an integration of the corrections in accordance with the method described above during the period LT of the training signal D(n). As is shown in FIG. 7, this first step is performed in the time interval $[p_1]$ centered around the instant $t_1$. Since the coefficients are initialized at zero at the beginning of the interval, the calculation of the coefficients are performed in accordance with the expression (19), which may be more briefly written for the interval [p₁]:

$$\vec{C}(p_1) = \left( \sum_{[p_1]}^{n} \epsilon_f(n) \cdot \vec{D}^*(n) \right) \cdot \frac{1}{L\sigma^2}$$

For the small frequency off-set found in practice (of the order of b 0.1 Hz) it may be rightfully assumed that during the whole interval [p₁] the phase $\phi(n)$ has the constant value $\phi(p_1)$ which is the mean value of the phase in the interval [p₁]. Therefore, the calculation of the coefficients by integration during the interval [p₁] provides coefficient values:

$$\vec{C}(p_1) \cong \vec{k} \cdot \exp j\phi(p_1) \quad (28)$$

This means that at the end of the first step the coefficients $\vec{C}(p_1)$ of the transversal filter have the values which permit of compensating the echo signal having the phase $\phi(p_1)$. During the remainder of the training period the coefficients are fixed at this value calculated in the first step.

In the second step, an integration of the products $\epsilon_f^*(n) \cdot \epsilon_f(n)$ or products $\hat{\epsilon}_f^*(n) \cdot e(n)$ is carried out during a time interval [p₂] equal to the period LT of the training signal, centered around the instant t₂, as is shown in FIG. 7. This integration provides a term s(p₂), which can be represented by the expression:

$$s(p_2) = \left( \sum_{[p_2]}^{n} \epsilon_f^*(n) \cdot \epsilon_f(n) \right) \cdot \frac{1}{L\sigma^2} \quad (29)$$

$$s(p_2) = \left( \sum_{[p_2]}^{n} \epsilon_f^*(n) \cdot e(n) \right) \cdot \frac{1}{L\sigma^2}$$

where the terms $\hat{\epsilon}_f(n)$ and $\hat{\epsilon}_f^*(n)$ represent the received echo signal and the complex conjugate value of the echo copy signal $\epsilon_f(n)$, respectively.

During the whole interval [p₂] simulated phase $\hat{\phi}(n)$ applied to the phase-shifting circuit 60 is set to zero so that the signal $\epsilon_f(n)$ is equal to the signal $\hat{\epsilon}_d(n)$ supplied by the transversal filter and therefore, it it follows that:

$$\hat{\epsilon}_f(n) = D(n) \cdot \vec{C}(p_1)$$

or, taking account of the calculation of C(p₁) in the first step:

$$\hat{\epsilon}_f(n) \cong \vec{D}(n) \cdot \vec{k} \cdot \exp j\phi(p_1)$$

By using this expression for $\hat{\epsilon}_f(n)$ and the expression (27) for $\epsilon_f(n)$ the calculation of s(p₂) in accordance with expression (29) yields:

$$s(p_2) = \left( \sum_{[p_2]}^{n} \vec{k}^* \cdot \vec{D}^*(n) \cdot \vec{D}(n) \cdot \vec{k} \cdot \exp j[\phi(n) - \phi(p_1)] \right) \cdot \frac{1}{L\sigma^2}$$

$$= |k|^2 \cdot \exp j[\phi(p_2) - \phi(p_1)] \cdot \left( \sum_{[p_2]}^{n} \vec{D}^*(n) \cdot \vec{D}(n) \right) \cdot \frac{1}{L\sigma^2}$$

Since the training signal D(n) has the autocorrelation property (14), the final result is:

$$s(p_2) \cong |k|^2 \cdot \exp j[\phi(p_2) - \phi(p_1)] \quad (30)$$

where $\phi(p_2)$ is the supposedly constant value of the phase $\phi(n)$ during the time interval [p₂].

Since the interval [p₂] is chosen to be sufficiently remote from the time interval [p₁] the phase shift $\phi(p_2) - \phi(p_1)$ has an appreciable magnitude which can be determined after the calculation of s(p₂). From formula (30) is can be derived:

$$\phi(p_2) - \phi(p_1) = \text{argument } [s(p_2)] = \arctan \frac{\pi m[s(p_2)]}{Re[s(p_2)]} \quad (31)$$

where Re[s(p₂)] and IIm[s(p₂)] represent the real part and the imaginary part of s(p₂), respectively.

After the calculation of the phase shift $\phi(p_2) - \phi(p_1)$, there can finally be calculated a phase variation term $\Delta\omega T = 2\pi \Delta f T$ proportional to the frequency offset $\Delta f$ by using the formula:

$$\Delta\omega \cdot T = \frac{\phi(p_2) - \phi(p_1)}{[P_2] - [P_1]} \quad (32)$$

where [p₂]−[p₁] is the time interval t₂−t₁, measured in numbers of periods T₃ between the intervals [p₂] and [p₁]. Equation (32) can, therefore, also be expressed as $$\Delta\omega = \frac{\phi(p_2) - \phi(p_1)}{t_2 - t_1}.$$

Since at the end of the time interval [p₁] the coefficients of the transversal filter 15 are fixed so as to correct an echo of mean phase $\phi(p_1)$ in this interval, it is possible to correct after the end of the time interval [p₂] an echo signal having a frequency off-set $\Delta f$, by producing a simulated phase $\phi(n)$ initialized just after the interval [p₂] to the value $\phi(p_2) - \phi(p_1)$ calculated in accordance with expression (31), and subsequently varying with the slope $\Delta\omega \cdot T$ calculated in accordance with expression (32).

It will now be described how the method according to the invention can be carried into effect in a canceller for an echo having frequency off-set. After a training time period, the method permits of initializing various parameters of the echo canceller. During this whole time period a training signal is transmitted, the properties of which are defined above. The first step, which permits of initializing the coefficients of the trasnversal filter 15 by an integration calculation of the corrections of the coefcents during a time interval [p₁] can be exactly carried out as described with reference to FIG. 2, 4 or 5. In order to explain how the second step can be carried out, which serves to initialize parameters concerning the simulated phase of the echo signal, it is useful to consider again the manner in which this simulated phase is controlled in a canceller for an echo having frequency off-set. For example, in the aforesaid French patent application No. 8006748, there is described an echo canceller, the simulated phase of which is controlled in accordance with the recursion formula:

$$\hat{\phi}(n+1) = \hat{\phi}(n) + \beta \cdot \text{IIm}[\epsilon_f(n) \cdot \hat{\epsilon}_f^*(n)] \quad (33)$$

In this recursion formula, $\beta$ is a coefficient of small value with respect to 1, which coefficient determines the magnitude of the correction to be applied to the phase $\hat{\phi}(n)$ to obtain the phase $\hat{\phi}(n+1)$ at the next iteration. In this control system the phase corrections are performed at each sampling period.

Figure 8:
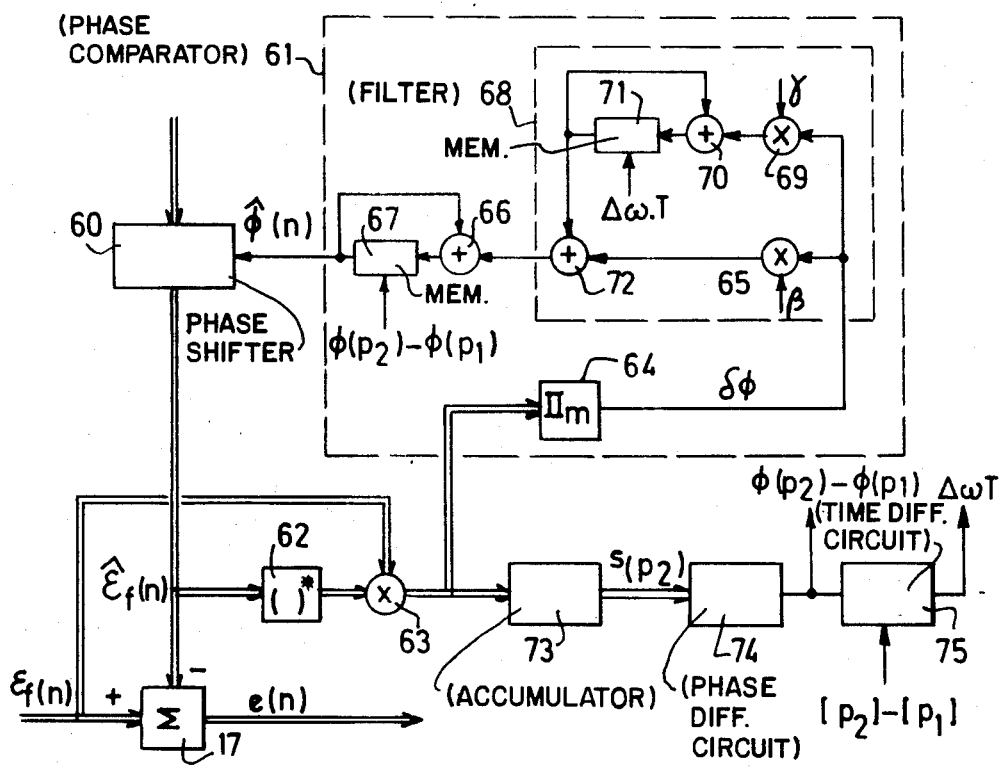
FIG. 8 shows the circuit of apparatus for carrying out the method of the invention in a canceller for echoes subjected to frequency off-set.

FIG. 8 shows primarily the simulated phase generator 61, which effectuates the recursion formula (33) in the echo canceller of FIG. 6. This generator, illustrated in FIG. 8 of the aforesaid French patent application, comprises a circuit 62 forming the term $\hat{\epsilon}_f^*(n)$, a multiplier 63 forming the project $\hat{\epsilon}_f^*(n) \cdot \epsilon_f(n)$ and a circuit 64 only retaining the imaginary part of this product. This imaginary part, which constitutes the phase shift $\delta\phi$ between the real phase and the simulated phase of the echo signal, is multiplied by the coefficient $\beta$ in a multiplier 65. The output of circuit 64 forms the terms of the phase correction $\beta II_m[\epsilon_f(n) \cdot \hat{\epsilon}_f^*(n)]$ which are accumulated in an accumulator formed by an adder 66 and a memory 67. This accumulator supplies the simulated phase $\hat{\phi}(n)$ to the phase-shifting circuit 60. In the phase generator 61, multiplier 65, multiplying by the coefficient $\beta$, plays the part of a loop filter of the first order in the phase control-loop and, as stated in the aforesaid French patent application, it is advantageous to use a loop filter of the second order which is formed by the circuits included in a block 68 indicated by broken lines. This filter 68 is formed by a multiplier 69, which multiplies the phase shift $\delta\phi$ by a coefficient $\gamma$ less than 1. The product $\gamma \cdot \delta\phi$ is applied to an accumulator formed by an adder 70 and a memory 71. The output signal of the accumulator 70, 71 is added by an adder 72 to the output signal of multiplier 65. The output signal of the adder 72 is applied to the accumulator 66, 67 which supplies the simulated phase $\hat{\phi}(n)$.

Before continuing the operation of this control circuit of the simulated phase, two parameters have to be initialized; i.e. the contents of memory 67 of the accumulator 66, 67 and the contents of memory 71 of the accumulator 70, 71. This initialization takes place at the end of the second step by transferring in memory 67 the calculated phase difference $\phi(p_2) - \phi(p_1)$, which is the initial phase attributed to be simulated phase $\hat{\phi}(n)$ and by transferring in memory 71 the quantity $\Delta\omega \cdot T$, which permits of obtaining the initial slope of the simulated phase.

In order to obtain these two initial quantities first the quantity $s(p_2)$ is calculated in accordance with the method of the invention. Thereto a circuit 73 is used which realizes formula (29). This circuit 73, which is arranged in a conventional manner to form an accumulator, receives the products $\epsilon_f(n) \cdot \hat{\epsilon}_f^*(n)$ formed at the output of multiplier 63 and accumulates these products during the time interval [p_2] after having been set to zero at the beginning of this interval. The complex quantity $s(p_2)$ thus formed at the end of the interval [p_2] is applied to a circuit 74 which forms the phase difference $\phi(p_2) - \phi(p_1)$ by using formula (31). Finally the difference $\phi(p_2) - \phi(p_1)$ is applied to a circuit 75, to which is also applied the time difference $[p_2] - [p_1]$ to form the phase variation $\Delta\omega \cdot T$ in accordance with formula (32). The calculated quantities $\phi(p_2) - \phi(p_1)$ and $\Delta\omega \cdot T$ are simultaenously transferred to the memories 67 and 71.

As is shown by the example described above for controlling the simulated phase $\hat{\phi}(n)$ during the tracking period or for calculating the quantity $s(P_2)$ during the initializing period, use is made of the same quantity of $\epsilon_f^*(n) \cdot \hat{\epsilon}_f(n)$ which is representative of the phase difference between the echo signal and the echo copy signal. In other embodiments of cancellers for echoes having a variable phase as disclosed in French patent application 8006748, a quantity representative of this phase difference may be calculated in an other way, which phase difference is at any rate necessary for a circuit for iteratively controlling the simulated phase. It will be clear that in these embodiments it is preferred to use the quantity representative of the phase difference already calculated to form the quantity $s(p_2)$.

Instead of using formula (31) to obtain the phase difference $\phi(p_2) - \phi(p_1)$ there may be used more easily implementable algorithms. One of these algrotihms consists in updating an auxiliary variable INT at a very high clock rate in accordance with the recursion formula:

$$INT(m+1) = INT(m) + \gamma[II_m s(p_2) - INT(m) \cdot r(p_2)] \quad (34)$$

In this formula $II_m s(p_2)$ is the imaginary part of the quantity $s(p_2)$ already defined, $\gamma$ is an integration constant and $r(p_2)$ is a quantity calculated by either of the following expressions:

$$r(p_2) = \left( \sum_{[p_2]}^{n} \epsilon_f(n) \cdot \epsilon_f^*(n) \right) \cdot \frac{1}{L\sigma^2} \quad (35)$$

$$r(p_2) = \left( \sum_{[p_2]}^{n} \hat{\epsilon}_f(n) \cdot \hat{\epsilon}_f^*(n) \right) \cdot \frac{1}{L\sigma^2}$$

It can be shown that the quantity $r(p_2)$ is substantially equal to the absolute value $|k|^2$ of the quantity $s(p_2)$: see formula (30).

In this case the recursion formula (34) can be written:

$$INT(m+1) = INT(m)[1 - \gamma \cdot |k|^2] + \gamma \cdot |k|^2 \sin[\phi(p_2) - \phi(p_1)]$$

It is inferred therefrom that after a sufficient number of iterations and provided $\gamma \cdot |k|^2$ is less than 1, the auxiliary variable INT practically assumes the value $$INT(\infty) = \sin[\phi(p_2) - \phi(p_1)]$$

The phase difference $\phi(p_2) - \phi(p_1)$ can then be readily obtained by reading a reference memory for the function arc sin, using INT as address.

Figure 9:
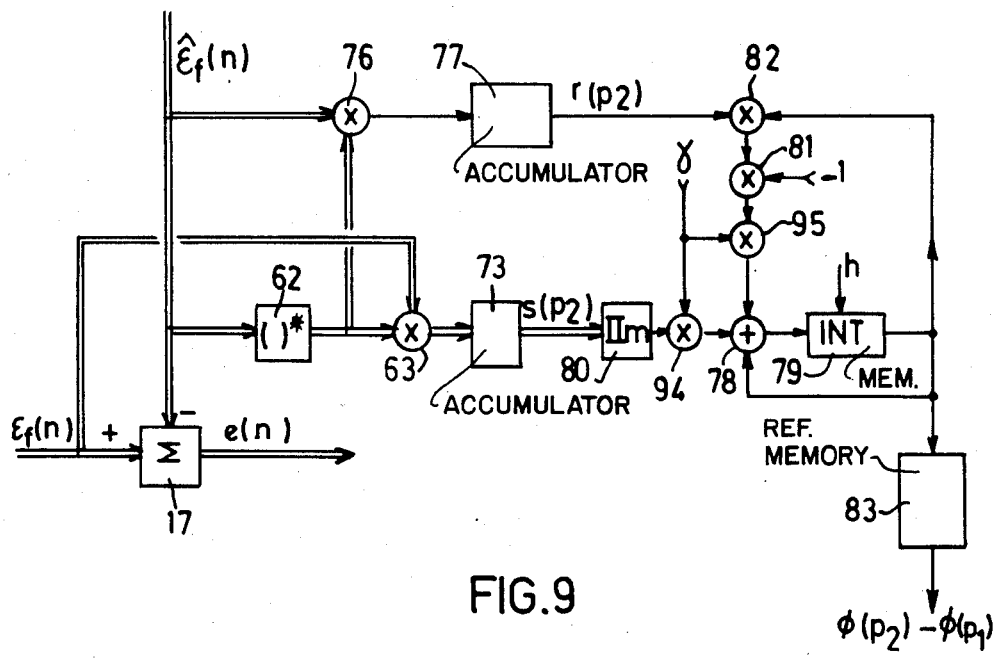
FIGS. 9, 10 and 11 show two embodiments of phase processing circuits for supplying a phase difference signal and a phase variation signal for initializing a canceller for echos subjected to frequency off-set.

FIG. 9 shows how the algorithm (34) can be implemented to calculate $\phi(p_2) - \phi(p_1)$ starting from the signals $\hat{\epsilon}_f(n)$ and $\hat{\epsilon}_f(n)$. The quantity $s(p_2)$ is formed as shown in FIG. 8 and is available at the output of circuit 73. On the other hand a multiplier 76 supplies the products $\epsilon_f(n) \cdot \epsilon_f^*(n)$ appearing in formula (35). These products are accumulated during the time interval [p_2] in a circuit 77 which thus supplies the quantity $r(p_2)$. In order to update the auxiliary variable INT according to the recursion formula (34), an accumulator is used which is formed by an adder 78 and a memory 79 which contains the auxiliary variable. The adder 78 has an input connected to the output of memory 79, a second input receiving the product $\gamma \cdot II_m s(p_2)$ formed with the aid of circuits 80 and 94, and a third input receiving the product $-\gamma \cdot INT(m) \cdot r(p_2)$ formed with the aid of circuits 82, 81, 95 connected as indicated in the FIG. 9.

The accumulation in the accumulator 78, 79 is performed at a clock frequency h which is very high as compared with the modulation rate 1/T so that in practice very soon after the time interval [p₂] the quantity INT(∞) is obtained at the output of the accumulator. This quantity serves as an address to read in a reference memory 83 for the function arc sin the phase difference $\phi(p_2) - \phi(p_1)$, which is used as described with reference to FIG. 8.

The phase difference $\phi(p_2) - \phi(p_2)$ can be obtained even more simply by using another algorithm which consists in producing an auxiliary variable INT according to the recursion formula $$INT(m+1) = INT(m) - \gamma \cdot IIm[s^*(p_2) \cdot \exp j \cdot INT(m)] \quad (36)$$

Taking into account the value s(p₂) given by formula (30) it can be shown that the recursion formula (36) can be written:

$$INT(m+1) = INT(m) - \gamma \cdot |k|^2 \sin [INT(m) - (\phi(p_2) - \phi(p_1))]$$

An approximate solution of this equation is:

$$INT(m+1) = INT(m)[1 - \gamma \cdot |k|^2] + \gamma \cdot |k|^2 [\phi(p_2) - \phi(p_1)]$$

It is inferred therefrom that after a sufficient number of iterations the auxiliary variable INT substantially assumes the value:

$$INT(\infty) = \phi(p_2) - \phi(p_1)$$

Figure 10:
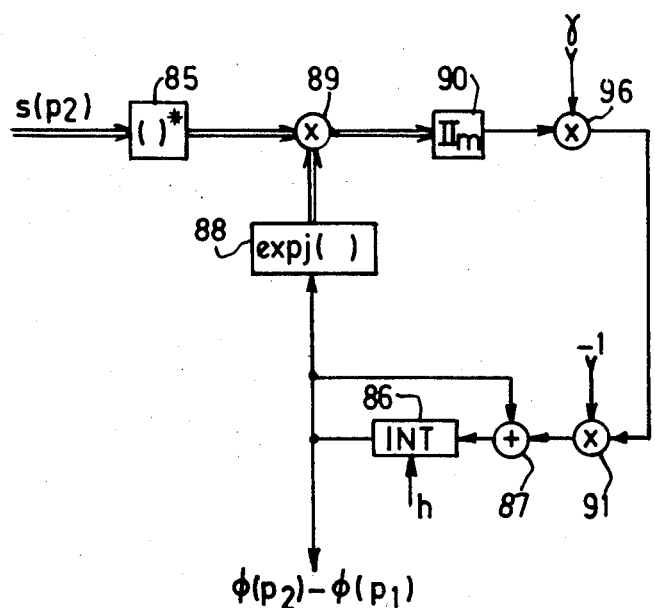

FIG. 10 shows how the algorithm (36) can be used to obtain the phase differnece $\phi(p_2) - \phi(p_1)$. The quantity s(p₂) formed as is indicated in FIG. 8 is applied to a circuit 85 which derives therefrom the complex conjugate value s*(p₂). The auxiliary variable INT is contained in a memory 86 of an accumulator formed by this memory and an adder 87. The output of memory 86 is connected to a circuit 88 which forms the quantity exp·j·INT(m). This quantity is multiplied by s*(p₂) with the aid of a multiplier 89. A circuit 90 extracts from the resultant product the imaginary part which is multiplied by the coefficient γ with the aid of a multiplier 96, the sign of the latter produt being changed by means of a circuit 91. The output of circuit 91 is connected to an input of adder 87. The accumulation in the accumulator 86, 87 is carried out at a very high clock rate h and very soon after the time interval [p₂] the desired phase difference $\phi(p_2) - \phi(p_1)$ is obtained at the output of the accumulator.

The phase variation $\Delta\omega \cdot T$ also required for initializing the echo canceller can be obtained by modifying the algorithm (36) in the following manner:

$$INT(m+1) = INT(m) - IIm\left[s^*(p_2) \cdot \exp j \cdot \frac{INT(m)}{[p_2] - [p_1]}\right] \quad (37)$$

It will now be easily seen that after a sufficient number of iterations the auxiliary variable INT assumes the value:

$$INT(\infty) = \frac{\phi(p_2) - \phi(p_1)}{[p_2] - [p_1]}$$

or:

$$INT(\infty) = \Delta\omega \cdot T.$$

Figure 11:
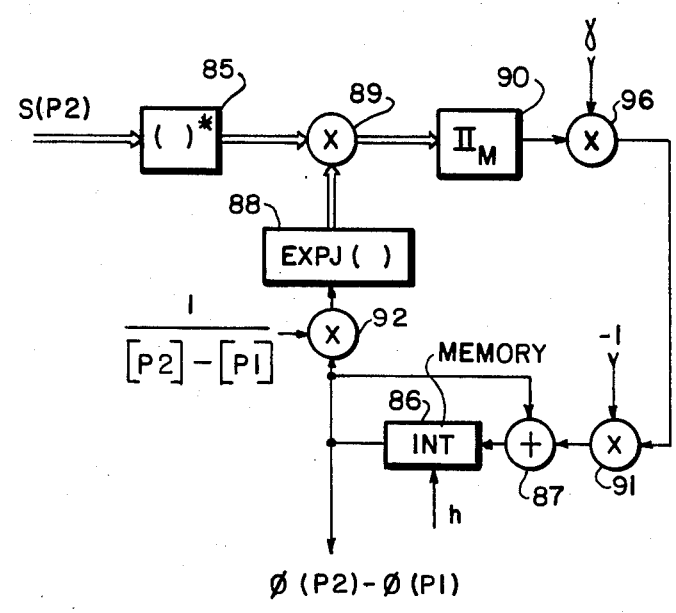

The modification of algorithm (36) to take account of any phase variation $\Delta\omega \cdot T$ can be implemented as is shown in FIG. 11, which is the same as FIG. 10 but further includes a circuit 92 which multiplies the quantity INT(m) applied to circuit 88 by the coefficient $$\frac{1}{[p_2] - [p_1]}$$

This results in that the contents of the accumulator 86, 87 rapidly assume the value of the phase variation $\Delta\omega \cdot T$. Alternatively the algorithms (36) and (37) can both be implemented in the same manner in accordance with the arrangement of FIG. 10. In a first time segment, the coefficient applied to multiplier 92 is fixed at the value 1 and accumulator 86, 87 supplies the phase difference $\phi(p_2) - \phi(p_1)$ which is transferred to memory 67 of FIG. 8. In a second time segment, this coefficient is fixed at the value $$\frac{1}{[p_2] - [p_1]}$$

and the variation $\Delta\omega \cdot T$ becomes available in memory 86, which may be the same as memory 71 of FIG. 8.

In some echo cancellers, it is known to directly process the real received signal without using circuits such as circuit 18 of FIG. 1 to form a complex signal. In these echo cancellers, the difference circuit 17 of the echo canceller has applied to it on the one hand the sampled received signal and on the other hand the real part of the complex signal ε(n) supplied by the transversal filter 15. The latter always receives a complex data signal and always operates with complex coefficients supplied by a control circuit such as circuit 16 of FIG. 1.

A method according to the invention also permits of reducing the convergence time of an echo canceller of this type. First the case of a linear echo canceller will be examined. The echo signal received in the receive path of the modem and directly used in the echo canceller under consideration may be regarded as being the real part of the complex echo signal which would be formed by circuit 18 in the case of the echo canceller of FIG. 1. After sampling, this received echo signal is $\epsilon_R(n)$ and can, therefore, be written:

$$\epsilon_R = Re[\epsilon(n)] = \epsilon(n) + \epsilon^*(n)$$

apart from the factor ½.

This results in that a data signal D(n) transmitted during a first time interval provides an echo signal $\epsilon_{R1}(n)$ of the form:

$$\epsilon_{R1}(n) = \vec{D(n)} \cdot \vec{k} + \vec{D^*(n)} \cdot \vec{k^*} \quad (38)$$

If in accordance with the ordinary method of the invention this signal D(n) is the periodic training signal having the autocorrelation properties (14) and if the coefficients are calculated by integration of the corrections of the coefficients during an interval [q₁], in which the echo produced in response to the transmitted signal is received, the calculated values of these coefficients can be written in a simplified manner, apart from a constant factor:

$$\vec{C}_1(q) = \sum_{[q_1]}^{n} \epsilon_{R1}(n) \cdot \vec{D}^*(n)$$

or, by using formula (38):

$$\vec{C}_1(q) = \vec{k} + \overline{\overline{E}}(n) \vec{k}^* \quad (39)$$

where $\overline{\overline{E}}(n)$ is a square matrix of the order N such that:

$$\overline{\overline{E}}(n) = \sum_{n=0}^{L-1} \vec{D}^*(n) \cdot \underline{D}^*(n)$$

In order to obtain, at the end of a single integration interval $[q_1]$, the samples $\vec{k}$ of the impulse response of the echo path for the coefficients $\vec{C}_1(q)$ of the transversal filter, the matrix $\overline{\overline{E}}(n)$ should be zero, which can be obtained by a training signal D(n) which has to satisfy not only the condition (14), i.e.:

$$\sum_{n=0}^{L-1} d(n) \cdot d^*(n - i) = 0$$

for $i \neq 0$ and $i = 1, 2, \ldots, N - 1$ but also the condition:

$$\sum_{n=0}^{L-1} d^*(n) \cdot d^*(n - i) = 0$$

for $i \neq 0$ and $i = 1, 2, \ldots, N - 1$

In order to avoid this new condition to be imposed on the training signal D(n) a different training signal $D_+(n)$ is transmitted in accordance with an advantageous variant of the method of the invention, during a second time interval when the echo provided by the first signal D(n) has disappeared. This signal $D_+(n)$ may be $$D_+(n) = jD(n).$$

This transmitted signal results in an echo signal $\epsilon_{R2}(n)$ such that:

$$\epsilon_{R2} = \underline{D}_+(n) \cdot \vec{k} + \underline{D}_+^*(n) \cdot \vec{k}^*$$

If on the basis of the signal $D_+(n)$ the coefficients of the transversal filter are calculated during a time interval $[q_2]$, this calculation can be written:

$$\vec{C}_2(q) = \sum_{[q_2]}^{n} \epsilon_{R2}(n) \cdot \vec{D}_+^*(n)$$

Taking into account the above expression for $\epsilon_{R2}(n)$ it is derived that:

$$\vec{C}_2(q) = \vec{k} + \overline{\overline{F}}(n) \cdot \vec{k} \quad (40)$$

where F(n) is a square matrix of the order N such that:

$$\overline{\overline{F}}(n) = \sum_{n=0}^{L-1} \vec{D}_+^*(n) \cdot \underline{D}_+^*(n)$$

Since $D_+(n) = jD(n)$, $\overline{\overline{F}}(n) = -\overline{\overline{E}}(n)$.

Thus, according to the formulae (39) and (40), when forming the sum of the coefficients $C_1(q)$ and $C_2$ calculated by integration during the time intervals $[q_1]$ and $[q_2]$, the desired coefficients are obtained, apart from a constant factor, i.e.:

$$\vec{C}(q) = \vec{C}_1(q) + \vec{C}_2(q) = \vec{k}$$

It will now be shown how the method according to the invention can be applied to cancellers for echoes having frequency off-set, in which the received signal is also processed without forming a corresponding complex signal. An echo canceller of this kind is shown by way of example in FIG. 11 of the aforesaid French patent application 8006748. This echo canceller has the general structure shown in FIG. 6 of the present patent application, but only real signals are used for the control of circuit 16 controlling the coefficient of the transversal filter 15 and for the control of the control circuit 61 for the simulated phase of the echo signal.

For initializing the parameters of such an echo canceller a method is used which is similar to that described earlier herein for cancellers for echoes having frequency off-set by processing of a complex echo signal. This method thus comprises two steps, one serving to initialize the coefficients of the transversal filter and the other serving to initialize the simulated phase of the echo signal and the slope of the variation of this phase. However, for carrying out each of these steps in an echo canceller using only the real part of the echo signal it is necessary to first transmit the training signal D(n) and then the signal $D_+(n) = jD(n)$ as stated above.

A signal D(n) transmitted during either of these two steps generates a real echo signal $\epsilon_{R1}(n)$ of the form:

$$\epsilon_{R1}(n) = \underline{D}(n) \cdot \vec{k} \cdot \exp j\phi(n) + \underline{D}^*(n) \cdot \vec{k}^* \cdot \exp -j\phi(n)$$

where $\phi(n)$ is the phase of the echo signal supposed to be constant during the step concerned. If the signal $D_{30}(n) = jD(n)$ is transmitted, an echo signal $\epsilon_{R2}(n)$ is obtained having the form:

$$\epsilon_{R2}(n) = j\underline{D}(n) \cdot \vec{k} \cdot \exp j\phi(n) + j\underline{D}^*(n) \cdot \vec{k}^* \cdot \exp -j\phi(n)$$

Therefore, instead of calculating the coefficients $\vec{C}_1(p)$ in a single time interval $[p_1]$ with the signals D(n) and $\epsilon_{R1}(n)$ (see FIG. 7), the first step calculates also coefficients $\vec{C}_2(p)$ with the signals jD(n) and $\epsilon_{R2}(n)$ in a second interval $[p_1]$ of the same duration and sufficiently close for the phase of the echo signal to have substantially the value $\phi(p_1)$ during these two time intervals. In the same manner as described above it can be shown that the sum of the coefficients thus calculated has the value mentioned below, apart from a coefficient $\frac{1}{2}$:

$$\vec{C}(p) = \vec{C}_1(p) + \vec{C}_2(p) = \vec{k} \cdot \exp j\phi(p_1)$$

During the remainder of the training period the coefficients of the transversal filter 15 are fixed at this value, which permits of compensating the echo signal having the phase $\phi(p_1)$.

A possible method of performing the second step is to approach the method already described for a complex echo signal and based on the calculation of a quantity $s(p_2)$ according to formula (29). In this method a quantity $s_1(p_2)$ is calculated in a time interval $[p_2]$ with the signals D(n) and $\epsilon_{R1}(n)$ such that:

$$S_1(p_2) = \left( \sum_{[p_2]}^{n} \hat{\epsilon}_f^*(n) \cdot \epsilon_{R1}(n) \right) \cdot \frac{1}{L\sigma^2}$$

Then, a quantity of $s_2(p_2)$ is calculated with the signals $D_{30}(n) = jD(n)$ and $\epsilon_{R2}(n)$ in a time interval $[p'_2]$ of the same duration as $[p_2]$ and sufficiently close for the phase of the echo signal to have the same value $\phi(p_2)$ such that:

$$S_2(p_2) = \left( \sum_{[p_2']}^{n} \hat{\epsilon}_f^*(n) \cdot \epsilon_{R2}(n) \right) \cdot \frac{1}{L\sigma^2}$$

In the same manner as described in the foregoing it can be shown that by forming the sum of the two quantities $s_1(p_2)$ and $s_2(p_2)$ the quantity $s(p_2)$ is obtained as:

$$s(p_2) = s_1(p_2) + s_2(p_2) \simeq |k|^2 \cdot \exp j[\phi(p_2) - \phi(p_1)]$$

The quantity $s(p_2)$ thus calculated has exactly the same value as that of the formula (30). By the same calculations or the same algorithms as described above the initial phase difference $\phi(p_2) - \phi(p_1)$ and the initial phase variation $\Delta\omega \cdot T$ to be transferred to the memories of the simulated phase generators of the echo canceller can be derived therefrom.

A further possible method of performing the second step consists in calculating the quantities $s'_1(p_2)$ and $s'_2(p_2)$ rather than the quantities $s_1(p_2)$ and $s_2(p_2)$ such that:

$$s'_1(p_2) = -\sum_{[p_2]}^{n} \hat{\epsilon}_{I1}(n) \cdot \epsilon_{R1}(n)$$

$$s'_2(p_2) = -\sum_{[p_2]}^{n} \hat{\epsilon}_{I2}(n) \cdot \epsilon_{R2}(n)$$

with $\epsilon_{Ij}(n) = \mathrm{II}_m[\hat{\epsilon}_j(n)]$.

It can be shown that by forming the sum of the two quantities $s'_1(p_2)$ and $s'_2(p_2)$ the quantity:

$$s'(p_2) = s'_1(p_2) + s'_2(p_2) = 4j|k|^2 \sin[\phi(p_2) - \phi(p_1)]$$

is obtained. From the quantity $s'(p_2)$ can be derived the phase difference $\phi(p_2) - \phi(p_1)$ and the phase variation $\Delta\omega \, T$.

In the latter method for the second step, the multiplications required for the calculation of the quantities $s'_1(p_2)$ and $s'_2(p_2)$ only relate to two real signals, which is simpler than the multiplication required in the other method for calculating the quantities $s_1(p_2)$ and $s_2(p_2)$ which relate to a real signal and a complex signal. It should be noted that the latter method is particularly suitable for initializing the echo canceller of FIG. 11 of French patent application 8006748, where the simulated phase is controlled by corrections proportional to the products of the same real signals. Finally, in the foregoing formulae, which permit of calculating quantities $s_1(p_2)$, $s_2(p_2)$, $s'_1(p_2)$, $s'_2(p_2)$ $s'_2(p_2)$ the received real signals $\epsilon_{R1}(n)$ and $\epsilon_{R2}(n)$ can be replaced by the corresponding difference signals $e_1(n)$ and $e_2(n)$.

What is claimed is:

1. A method of reducing the convergence time of an echo canceller connected in a transceiver arrangement between one-way transmit and receive paths coupled to a two-way path and used to cancel an echo signal occurring in the receive path of the transceiver in response to a signal supplied to the transmit path thereof, said echo canceller comprising a transversal filter having a number N of controllable coefficients for producing an output signal derived from the signal supplied to the transmit path, and a difference circuit for producing a signal e(n) corresponding to the difference between two signals which are formed from the signal in the receive path of the transceiver and the output signal of the transversal filter, respectively; said method comprising at least the following steps:

transmitting in the transmit path of the transceiver a training data signal D(n) constituted by complex datums transmitted at instants nT, T being the datum period and n being an integer, such signal D(n) being periodically reproduced with a period LT where L is an integer such that LT is at least equal to NT, and having the property:

$$\sum_{n=0}^{L-1} d(n) \cdot d^*((n-i) \text{ modulo } L) = 0 \text{ for } i \neq 0 \text{ and } 1 \leq i \leq N - 1$$

where d and $d^x$ are the complex value of a datum of the signal D(n) and its complex conjugate value, respectively;

storing in the transversal filter the values of the N datums of the signal D(n) transmitted during each period LT thereof; and calculating the coefficients of the transversal filter after the instant of appearance of an echo signal $\epsilon(n)$ occurring in the receive path of the transceiver in response to said transmitted training data signal in the transmit path in accordance with the expression:

$$\vec{C} = \vec{C}_o + \frac{1}{L\sigma^2} \sum_{n=0}^{L-1} e(n) \cdot \vec{D}^*(n)$$

where $\vec{C}_o$ and $\vec{C}$ are the vectors of the N coefficients of the transversal filter at the beginning and at the end of such calculation, respectively, e(n) is the difference signal, $\vec{D}^x(n)$ is the vector of the complex conjugate values of the N datums of the signal D(n) stored in the transversal filter, and $\sigma^2$ is a constant term representative of the power of each of the transmitted datums.

2. The method as claimed in claim 1 wherein the coefficients of the adaptive filter are made to equal zero at the beginning of calculation of said coefficients, whereby in said expression for calculation of the coefficients, $\vec{C}_o$ is equal to zero and the difference signal e(n) is equal to the received echo signal $\epsilon(n)$.

3. The method as claimed in claim 1, wherein the difference signal e(n) is a complex signal resulting from the difference between two complex signals, one derived from the received echo signal $\epsilon(n)$ and the other from the output signal of the transversal filter, and the coefficient vector $\vec{C}$ of the transversal filter is calculated during transmission of a single period LT of the training signal D(n).

4. The method as claimed in claim 1, wherein after appearance in the receive path of the transceiver of an echo signal in response to the transmitted training signal D(n) a second training signal $D_+(n)$ is transmitted in the transmit path of the transceiver, such second training signal being related to the first training signal by the relation $D_+(n) = jD(n)$; the difference signal e(n) is a real signal representing the difference between two real signals, one derived from the received echo signal in response to the signal D(n) and the other from the output signal of the transversal filter; and the coefficient vector $\bar{C}$ of the transversal filter is obtained by forming the sum of coefficients calculated while transmitting the first training signal D(n) and of coefficients calculated while transmitting the second training signal $D_+(n)$.

5. The method as claimed in claim 4 and used in a local transceiver arrangement receiving, apart from the echo signal produced in response to the transmitted training data signal D(n), a signal produced in response to the transmission of a training data signal G(n) by a remote transceiver arrangement; said signal G(n) being periodic and being constituted by complex datums G(n) transmitted at instants nT; and the signals D(n) and G(n) having, in addition, the property that:

$$\sum_{n=0}^{L-1} d^* ((n - i) \text{ modulo } L) \cdot g ((n - i') \text{ modulo } L)$$

is equal to zero or to minus one for valve of i and i' such that $0 \leq i \leq N-1$ and $0 \leq i' \leq N-1$,
where g is the value of a datum of the data signal G(n).

6. The method as claimed in claim 4 and used in a local transceiver arrangement receiving, apart from the training data signal D(n), a noise signal produced in response to the transmission of an arbitrary data signal by a distant transceiver arrangement, the coefficients being calculated during a period LT chosen so that L/N is substantially equal to R, where R is the desired ratio between the power of the relieved echo signal and the power of the noise signal.

7. An apparatus for calculating the coefficients of a transversal filter of an echo canceller adapted to be used in carrying out a method as claimed in claim 1, said apparatus comprising:
first calculation circuit means for forming at each instant nT the products of the complex conjugate values of the N datums then stored in the transversal filter and the difference signal at each instant,
second calculation circuit means connected to said first calculation circuit means for weighting the products produced at each instant by the weighting coefficient $1/(L \sigma^2)$,
and accumulators for accumulating the weighted products produced by said second calculation circuit means during a time interval of a duration LT, the values of the coefficients of the adaptive filter being simultaneously output by said accumulators at the end of said time interval LT.

8. An apparatus as claimed in claim 7 wherein the accumulators are reset to zero at the beginning of said time interval LT and further comprising means for blocking continued arrival of said weighted products at the input of the accumulators after the end of said time interval LT.

9. The method as claimed in claim 1 and used in an echo canceller for echoes subjected to frequency off-set and consequent phase shift with respect to the transmitted training data signal D(n), such echo canceller comprising, besides a transversal filter having N controllable coefficients, a phase-shifting circuit connected between the output of the transversal filter and an input of the difference circuit and receiving a simulated phase signal from a phase generator for compensating the difference signal produced by the difference circuit for the phase shift of the echo signal, said method comprising at least the following steps:
transmitting said training signal D(n) during two time intervals, $p_1$ and $p_2$ each having said duration LT, and during which the phase of the echo signal has the values $\phi(p_1)$, $\phi(p_2)$, respectively, each being substantially constant, the time between said two intervals exceeding either interval;
during the time interval $p_1$, calculating the coefficients of the transversal filter;
during the time interval $p_2$:
maintaining the coefficients of the transversal filter at their calculated values,
maintaining the simulated phase signal applied to said phase-shifting circuit at zero,
calculating a complex quantity $s(p_2)$ formed by accumulating products of two factors, one derived from the output signal of the phase-shifting circuit and the other derived from the difference signal or from the received signal; and
at the end of the time interval $p_2$ performing a processing operation to derive from the quantity $s(p_2)$ the phase difference term $\phi(p_2) - \phi(p_1)$ and a further processing operation to derive from said phase difference term a phase variation term $\Delta\omega \cdot T$ formed in accordance with $$\Delta\omega = \frac{\phi(p_2) - \phi(p_1)}{t_2 - t_1}$$

where $\Delta\omega$ represents the angular frequency variation corresponding to the echo signal frequency off-set and $t_2 - t_1$ is the average time difference between the time intervals and $p_2$ and $p_1$, the two terms thus formed being used to initialize the simulated phase signal produced by said phase generator.

10. The method as claimed in claim 9 and used in an echo canceller in which the difference signal e(n) is a complex signal resulting from the difference between two complex signals, one derived from the received echo signal and the other from the output signal of the phase-shifting circuit, and the coefficient vector $\bar{C}$ of the transversal filter and said quantity $s(p_2)$ are calculated while transmitting a single training signal D(n).

11. The method as claimed in claim 7, wherein after appearance in the receive path of the transceiver of an echo signal in response to the transmitted training signal D(n) a second training signal $D_+(n)$ is transmitted in the transmit path of the transceiver, such second training signal being related to the first training signal by the relation $D_+(n) = jD(n)$; the difference signal e(n) is a real signal resulting from the difference between two real signals, one derived from the received echo signal in response to the signal D(n) and the other from the output signal of the phase-shifting circuit; the coefficient vector $\bar{C}$ of the transversal filter is obtained by forming the sum of coefficients calculated while transmitting the first training signal D(n) and of coefficients calculated while transmitting the second training signal $D_+(n)$; and said quantity $s(p_2)$ is obtained by forming the sum of a quantity $s_1(p_2)$ calculated while transmitting the first training signal D(n) and a quantity $s_2(p_2)$ calculated while transmitting the second training signal $D_+(n)$.

12. A method as claimed in claim 11 wherein the calculation of each of the quantities $s(p_2)$, $s_1(p_2)$ and $s_2(p_2)$ is carried out in accordance with one of the two expressions:

$$\left(\sum_{n=0}^{L-1} \epsilon^*_f(n) \cdot \epsilon_f(n)\right) \cdot \frac{1}{L\sigma^2}, \text{ and}$$

$$\left(\sum_{n=0}^{L-1} \epsilon^*_f(n) \cdot e(n)\right) \cdot \frac{1}{L\sigma^2}$$

where
$\epsilon^*_f(n)$ is the conjugate value of the signal $\epsilon_f(n)$ supplied by the phase-shifting circuit, and
$\epsilon_f(n)$ is a complex or a real signal derived from the received signal.

13. The method as claimed in claim 12 wherein the processing operation which is performed at the end of the time interval $p_2$ to derive the phase difference term $\phi(p_2) - \phi(p_1)$ consists in calculating this phase difference term in accordance with the expression:

$$\phi(p_2) - \phi(p_1) = \arctan \frac{IIm\ s(p_2)}{Re\ s(p_2)}$$

where Re $s(p_2)$ and IIM $s(p_2)$ respectively are the real part and the imaginary part of the complex quantity $s(p_2)$.

14. The method as claimed in claim 12 wherein during the time interval $p_2$ a further quantity $r(p_2)$ is calculated in accordance with one of the two expressions:

$$r(p_2) = \left(\sum_{n=0}^{L-1} \epsilon_f(n) \cdot \epsilon^*_f(n)\right) \cdot \frac{1}{L\sigma^2}, \text{ and}$$

$$r(p_2) = \left(\sum_{n=0}^{L-1} \hat{\epsilon}_f(n) \cdot \hat{\epsilon}^*_f(n)\right) \cdot \frac{1}{L\sigma^2},$$

and the processing operation performed at the end of the time interval $p_2$ to derive the phase difference term $\phi(p_2) - \phi(p_1)$ consists in:
updating an auxiliary variable INT in accordance with the recursion formula:

$$INT(m+1) = INT(m) + \gamma \cdot IIm\ s(p_2) - \gamma \cdot INT(m) \cdot r(p_2)$$

wherein $\gamma$ is a constant less than one, at a high rate so that the auxiliary variable attains its final value approximating INT $(\infty)$ within a relatively short time, and
calculating the phase difference $\phi(p_2) - \phi(p_1)$ in accordance with the expression:

$$\phi(p_2) - \phi(p_1) = \arcsin (INT(\infty)).$$

15. The method as claimed in claim 12 wherein the processing operation performed at the end of the time interval $p_2$ to derive the phase difference term $\phi(p_2) - \phi(p_1)$ consists in updating an auxiliary variable INT in accordance with the recursion formula:

$$INT(m+1) = INT(m) - \gamma \cdot IIm(s^x(p_2) \cdot \exp j \cdot INT(m))$$

where $s^x(p_2)$ is the complex conjugate of the quantity $s(p_2)$, $\gamma$ is a constant less than one, and IIm is the imaginary part of the term in parentheses, such updating being performed at a high rate so that the auxiliary variable INT attains its final value within a relatively short time, said final value being equal to the phase difference $\phi(p_2) - \phi(p_1)$.

16. The method as claimed in claim 15 wherein the phase variation term $\Delta\omega T$ is obtained by updating said auxiliary variable INT in accordance with the recursion formula:

$$INT(m+1) = INT(m) - IIm\left(s^*(p_2) \cdot \exp j \cdot \frac{INT(m)}{p_2 - p_1}\right)$$

at a high rate so that the auxiliary variable attains its final value within a relatively short time, said final value being equal to the phase variation $\Delta\omega T$.

17. A method of reducing the convergence time of an echo canceller connected in a transceiver arrangement having one-way transmit and receive paths coupled to a two-way path and used to cancel an echo signal occurring in the receive path of the transceiver in response to a signal, supplied to the transmit path thereof, which does not have a d.c. component; said echo canceller comprising a transversal filter having a number N of controllable coefficients for producing an output signal derived from the signal supplied to the transmit path, and a difference circuit for producing a signal $e(n)$ corresponding to the difference between two signals which are formed from the signal in the receive path of the transceiver and the output signal of the transversal filter, respectively; said method comprising at least the following steps:
transmitting in the transmit path of the transceiver a training data signal $D(n)$ constituted by complex datums transmitted at instants $nT$, T being the datum period and n being an integer, such signal $D(n)$ being periodically reproduced with a period LT where L is an integer such that LT is at least equal to NT, and having the property:

$$\sum_{n=0}^{L-1} d(n) \cdot d^* ((n-i) \text{ modulo } L) = \sigma - 1$$

for $i \neq 0$ and $1 \leq i \leq N - 1$ where d and $d^x$ are the complex value of a datum of the signal $D(n)$ and its complex conjugate value, respectively;
storing in the transversal filter the values of the N datums of the signal $D(n)$ transmitted during each period LT thereof; and
calculating the coefficients of the transversal filter after the instant of appearance of an echo signal $\epsilon(n)$ occurring in the receive path of the transceiver in response to said transmitted training data signal in accordance with the expression:

$$\vec{C} = \vec{C_o} + \frac{1}{L\sigma^2} \sum_{n=0}^{L-1} e(n) \cdot \vec{D^*}(n)$$

where $C_0$ and C are the vectors of the N coefficients of the transversal filter at the beginning and at the end of said calculation, respectively,
$e(n)$ is the difference signal,
$\vec{D^x}(m)$ is the vector of the complex conjugate values of the N datums of the signal $D(n)$ stored in the transversal filter, and
$\sigma^2$ is a constant term representative of the power of each of the transmitted datums.

* * * * *